United States Patent
Da Silva

(10) Patent No.: US 11,528,760 B2
(45) Date of Patent: Dec. 13, 2022

(54) CELL GLOBAL IDENTIFICATION REPORT PROCEDURE FOR NEW RADIO CELLS WITHOUT SIB1

(71) Applicant: Telefonaktiebolaget LM Ericsson (publ), Stockholm (SE)

(72) Inventor: Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/058,235

(22) PCT Filed: Jul. 31, 2019

(86) PCT No.: PCT/SE2019/050717
§ 371 (c)(1),
(2) Date: Nov. 24, 2020

(87) PCT Pub. No.: WO2020/032861
PCT Pub. Date: Feb. 13, 2020

(65) Prior Publication Data
US 2021/0195663 A1    Jun. 24, 2021

Related U.S. Application Data

(60) Provisional application No. 62/716,140, filed on Aug. 8, 2018.

(51) Int. Cl.
*H04W 76/11* (2018.01)
*H04W 24/10* (2009.01)
(Continued)

(52) U.S. Cl.
CPC ............ *H04W 76/11* (2018.02); *H04W 24/10* (2013.01); *H04W 56/001* (2013.01); *H04W 84/042* (2013.01); *H04W 92/20* (2013.01)

(58) Field of Classification Search
CPC ... H04W 76/11; H04W 24/10; H04W 56/001; H04W 84/042; H04W 92/20
(Continued)

(56) References Cited

U.S. PATENT DOCUMENTS 10,674,536 B2 *  6/2020  Sun ..................... H04W 72/042
2010/0167746 A1 *  7/2010  Lee ....................... H04W 48/12
                                                                    455/450
(Continued)

FOREIGN PATENT DOCUMENTS

WO    WO-2019196906 A1 * 10/2019 .......... H04J 11/0073

OTHER PUBLICATIONS

PCT International Search Report and Written Opinion dated Dec. 10, 2019 for International Application No. PCT/SE2019/050717, 26 pages.
(Continued)

*Primary Examiner* — Mong-Thuy T Tran
(74) *Attorney, Agent, or Firm* — Sage Patent Group

(57) ABSTRACT

A wireless device receives (1502) configuration information indicating that the wireless device is to report identifier information for a cell. The configuration information identifies a first frequency. The wireless device acquires (1504) a first part of system information for the cell on the first frequency, using the configuration information. The wireless device determines (1506) that a second part of system information for the cell is not transmitted on the first frequency. The second part of system information for the cell is necessary for determining the identifier information. The wireless device receives (1508) the second part of system information, including the identifier information, on a second frequency and reports (1510) the identifier information for the cell to the wireless communications network.

17 Claims, 20 Drawing Sheets

(51) Int. Cl.
*H04W 56/00* (2009.01)
*H04W 84/04* (2009.01)
*H04W 92/20* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2014/0087715 | A1* | 3/2014 | Suzuki | H04W 24/10 455/422.1 |
| 2018/0132168 | A1* | 5/2018 | Ingale | H04W 48/10 |
| 2019/0182716 | A1 | 6/2019 | Futaki et al. | |
| 2019/0223145 | A1* | 7/2019 | Jung | H04W 76/27 |
| 2019/0380128 | A1* | 12/2019 | Park | H04W 48/08 |
| 2020/0359302 | A1* | 11/2020 | Chen | H04W 76/11 |

OTHER PUBLICATIONS

Vivo, 3GPP TSG-RAN WG2 Meeting #102, R2-1807626, "Report of Email Discussion [101 bis#47][NR] ANR", Busan, Korea, May 21-25, 2018, 19 pages.
Vivo, 3GPP TSG-RAN WG2 NR AH1807 Meeting, R2-1809859, "Remaining Issue for ANR", Montreal, Canada, Jul. 2-6, 2018, 3 pages.
Vivo, 3GPP TSG-RAN WG2 NR AH1807, R2-1809861, "CR on 38.331 for ANR", Montreal, Canada, Jul. 2-6, 2018, 8 pages.
Ericsson, 3GPP TSG-RAN WG2#104, R2-1817303, "SSBs without SI81 and CD-SSB in CGI Reporting", Spokane, USA, Nov. 12-16, 2018, 3 pages.
Mediatek Inc., 3GPP TSG RAN WG2 Meeting #101 bis, R2-1804610, "TP to 38.300 on Cell-Defining SSB", Sanya, China, Apr. 16-20, 2018, 4 pages.
Huawei, 3GPP TSG-RAN3 Meeting #102, R3-186489, "(TP for BL CR for TS 38.423),SSB Type Indication Over Xn", Spokane, US, Nov. 12-16, 2018, 3 pages.
Oppo, 3GPP TSG-RAN2#102, R2-1806947, "ARFCN Issue for Horizontal Key Derivation in NR", Busan, Korea, May 21-25, 2018, 4 pages.
3Gpp, 3GPP TS 38.331 V15.6.0, Technical Specification Group Radio Access Network, NR, "Radio Resource Control (RRC) Protocol Specification (Release 15)", (Jun. 2019), Valbonne, France, 519 pages.
PCT International Preliminary Report on Patentability dated Sep. 15, 2020 for International Application No. PCT/SE2019/050717, 23 pages.

* cited by examiner

1300

EXCHANGE, WITH A SECOND NETWORK NODE OPERATING IN THE WIRELESS COMMUNICATIONS NETWORK, INFORMATION INDICATING FREQUENCIES FOR CELL-DEFINING SYNCHRONIZATION BLOCKS (CD-SSBS) ASSOCIATED WITH NEIGHBOR CELLS
1302

CELL GLOBAL IDENTIFICATION REPORT PROCEDURE FOR NEW RADIO CELLS WITHOUT SIB1

CROSS-REFERENCE TO RELATED APPLICATIONS

This application is a 35 U.S.C. § 371 national stage application for International Application No. PCT/SE2019/050717, entitled "CGI REPORT PROCEDURE FOR NR CELLS WITHOUT SIB1," filed on Jul. 31, 2019, which claims priority to U.S. Provisional Patent Application No. 62/716,140, filed on Aug. 8, 2018, the disclosures and contents of which are hereby incorporated by reference in their entireties.

TECHNICAL FIELD

The present disclosure is generally concerned with wireless communications and is particularly related to Automatic Neighbor Relation (ANR) management and Cell Global Identification (CGI) reporting.

BACKGROUND

Since Long Term Evolution (LTE) Release 8, Automatic Neighbor Relation (ANR) management has been standardized to enable an eNB to establish automatic neighbor relations and enable an automatic X2 setup with neighboring eNBs. That is done by configuring a user equipment (UE) with a Physical Cell Identity (PCI) and a frequency (measurement object), so that the UE reads the system information of the so-configured neighbor cell in a System Information Block (SIB 1) and reports relevant information, such as the Cell Global Identification (CGI), Tracking Area Code (TAC), Public Land Mobile Network (PLMN) identifier, etc., back to its serving node in a measurement report. Thanks to that report, the serving node eNB can find the potential neighbor, establish a neighbor relation and trigger the setup of an X2 connection.

ANR and CGI reporting will be used for wireless networks under development by members of the Third Generation Partnership Project (3GPP). This impacts both LTE and New Radio (NR) Resource Radio Control (RRC) specifications, in different manners. For example, the following possibilities have been agreed to: a UE connected to an LTE eNB is configured to report the CGI of a Long Term Evolution (LTE) cell or NR cell; a UE connected to an LTE gNB (for LTE connected to the 5G core, or 5GC) is configured to report the CGI of an LTE cell or NR cell; and a UE connected to an NR gNB is configured to report the CGI of an LTE cell or NR cell.

Current agreements for ANR (reportCGI functionality in RRC) include a number of configurations. For ANR, this includes intra and inter-RAT (radio access technology) cases, ANR configuration may support inter-RAT ANR towards NR configured by an eNB, intra-RAT ANR towards NR configured by a gNB and inter-RAT ANR towards LTE configured by a gNB. In the case of an Evolved Universal Terrestrial Radio Access (E-UTRA)—NR Dual Connectivity (EN-DC) UE, an ANR function towards an NR cell can be configured by a Secondary Node (SN). The UE can only be configured with a single reportCGI configuration, from either the Master Bode (MN) or an SN. Another configuration of ANR towards an NR cell requires coordination between the MN and an SN.

For ANR reporting, the CGI content includes: a Public Land Mobile Network (PLMN) list, Tracking Area Code (TAC), frequency band list and CGI as baseline. The Radio Access Network Area Code (RANAC) may also be reported, if included in system information block 1 (SIB 1). In the case where the SIB 1/RMSI (Remaining Minimum SI) is not broadcast, the UE should report a notification to network. The UE report includes a "no SIB1 provided" indication. The UE may also report where a Cell Defining Synchronization Signal Block (CD-SSB) of the measured SSB can be found. In the case where the SIB 1/RMSI is not broadcast, the UE should report "no SIB1 provided indication" without waiting for T321 timer expiry and stop timer. In the case of EN-DC, if reportCGI for NR cell is configured by eNB, then the UE behavior follows an inter-RAT ANR T321 value. If reportCGI for NR cell is configured by a gNB, then the UE behavior follows an intra-RAT ANR T321 value.

The following are ANR measurement cases: a UE served by an LTE cell towards an NR cell; a UE served by an NR cell towards the NR cell; and a UE served by an NR cell towards an LTE cell. For UE capability for ANR towards an NR cell, discontinuous reception (DRX) based reading of ANR towards an NR cell related measurement may be supported. It may be feasible to use an autonomous gap. For ANR CGI reporting, only one NR neighbor cell configuration is supported at a time. A UE capability bit may be introduced in NR for Intra-RAT ANR (including inter and Intra frequency), for Inter-RAT ANR towards an LTE cell and for Inter-RAT ANR towards NR cell. Two separate capability bits may be needed for LTE with and without EN-DC configured.

These aspects are currently captured in the RRC specifications of NR TS 38.331 as follows, with the most relevant parts being in bold:

-------- Begin Excerpt ---------------------------------
5.5    Measurements
. . .
5.5.3   Performing measurements
5.5.3.1 General
. . .
The UE shall:
. . .
1>   for each measId included in the measIdList within VarMeasConfig:
   2> if the reportType for the associated reportConfig is set to reportCGI:
      3>   perform the corresponding measurements on the frequency and RAT indicated in the associated measObject using autonomous gaps as necessary;
NOTE 1:     When autonomous gaps are used to perform measurements, the UE is allowed to temporarily abort communication with all serving cell(s), i.e. create autonomous gaps to perform the corresponding measurements within the limits specified in TS 38.133.
         3> if the cell indicated by the cellForWhichToReportCGI is an NR cell and the cell is broadcasting SIB1 (see TS 38.213, section 13);
           4> try to acquire the global cell identity of the cell indicated by the cellForWhichToReportCGI by acquiring the relevant system information from the concerned cell;
           4> try to acquire the tracking area code in the concerned cell;
           4> try to acquire the list of additional PLMN Identities, if multiple PLMN identities are broadcast in the concerned cell;
           4> try to acquire the list of frequency bands, if multiple frequency bands are broadcast in the concerned cell;
. . .
   2> perform the evaluation of reporting criteria as specified in 5.5.4.
. . .

5.5.4 Measurement report triggering
1. 5.5.4.1 General
If security has been activated successfully, the UE shall:
1> for each measId included in the measIdList within VarMeasConfig:
...
    2> if the corresponding reportConfig includes a reportType set to reportCGI:
        3> consider a neighboring cell detected on the associatedmeasObject which has a physical cell identity matching the value of the cellForWhichToReportCGI included in the corresponding reportConfig within the VarMeasConfig to be applicable;
...
    2> if reportType is set to reportCGI;
        3> if the UE acquired the information needed to set all fields of cgi-Info for the requested cell; or
        3> if the UE detects that the requested NR cell is not transmitting SIB1 (see TS 38.213, section 13):
            4> stop timer T321;
            4> include a measurement reporting entry within the VarMeasReportList for this measId;
            4> set the numberOfReportsSent defined within the VarMeasReportList for this measId to 0;
            4> initiate the measurement reporting procedure, as specified in 5.5.5;
    2> upon the expiry of T321 for this measId:
        3> include a measurement reporting entry within the VarMeasReportList for this measId;
        3> set the numberOfReportsSent defined within the VarMeasReportList for this measId to 0;
        3> initiate the measurement reporting procedure, as specified in 5.5.5;
5.5.5 Measurement reporting FIG. 1 shows measurement reporting by a UE.

The purpose of this procedure is to transfer measurement results from the UE to the network. The UE shall initiate this procedure only after successful security activation.

For the measId for which the measurement reporting procedure was triggered, the UE shall set the measResults within the MeasurementReport message as follows:

1> set the measId to the measurement identity that triggered the measurement reporting;
    1> set the measResultServingCell within measResultServingMOListto include RSRP, RSRQ and the available SINR for each configured serving cell derived based on the rsType indicated in the associated reportConfig;
    1> set the measResultServingCell within measResultServingMOList to include for each NR serving cell that is configured with servingCellMO, if any, the servCellId;
    1> if the reportConfig associated with the measId that triggered the measurement reporting includes reportQuantityRsIndexes and maxNrofRSIndexesToReport:
        2> for each serving cell configured with servingCellMO, include beam measurement information according to the associated reportConfig as described in 5.5.5.2;
    1> if the reportConfig associated with the measId that triggered the measurement reporting includes reportAddNeighMeas:
        2>for each serving cell measObjectId referenced in the measIdList, other than the measObjectId corresponding with the measId that triggered the measurement reporting:
            3> set the measResultBestNeighCell within measResultServingMOList to include the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR;
            3> if the reportConfig associated with the measId that triggered the measurement reporting includes reportQuantityRsIndexes and maxNrofRSIndexesToReport:
            4> for each best non-serving cell included in the measurement report:
                5>include beam measurement information according to the associated reportConfig as described in 5.5.5.2;
    1> if there is at least one applicable neighbouring cell to report:
        2> set the measResultNeighCells to include the best neighbouring cells up to maxReportCells in accordance with the following:
            3> if the reportType is set to eventTriggered:
                4> include the cells included in the cellsTriggeredList as defined within the VarMeasReportList for this measId;
            3> else:
                4> include the applicable cells for which the new measurement results became available since the last periodical reporting or since the measurement was initiated or reset;
                4> if reportQuantityRsIndexes and maxNrofRSIndexesToReport are configured, include beam measurement information as described in 5.5.5.2;
        3> for each cell that is included in the measResultNeighCells, include the physCellId;
        3> if the reportType is set to eventTriggered:
            4> for each included cell, include the layer 3 filtered measured results in accordance with the reportConfig for this measId, ordered as follows:
                5> if the measObject associated with this measId concerns NR:
                    6> if rsType in the associated reportConfig is set to ssb:
                        7> set resultsSSB-Cell within the measResult to include the SS/PBCH block based quantity(ies) indicated in the reportQuantityCell within the concerned reportConfig, in order of decreasing trigger quantity, i.e. the best cell is included first:
                            8> if reportQuantityRsIndexes and maxNrofRSIndexesToReport are configured, include beam measurement information as described in 5.5.5.2;
                    6> else if rsType in the associated reportConfig is set to csi-rs:
                        7> set resultsCSI-RS-Cell within the measResult to include the CSI-RS based quantity(ies) indicated in the reportQuantityCell within the concerned reportConfig, in order of decreasing trigger quantity, i.e. the best cell is included first:
                              8> if reportQuantityRsIndexes and maxNrofRSIndexesToReport are, include beam measurement information as described in 5.5.5.2;
        3> if the reportType is set to reportCGI:
            4> if the cell indicated by cellForWhichToReportCGI is a NR cell:
                5> if the UE has acquired the mandatory present fields of the cgi-Info for the cell indicated by cellForWhichToReportCGI in the associated reportConfig:
                    6> include the global cell identity, tracking area code and RAN area code of the cell indicated by the cellForWhichToReportCGI;
                    6> include the list of additional PLMN Identities, if multiple PLMN identities are broadcast in the concerned cell;
                    6> include the list of frequency bands, if multiple frequency bands are broadcast in the concerned cell;
                5> else if the requested cell is not broadcasting SIB1:
                  6> include the noSIB1 indication;
Editor's Note: FFS Capture inter-RAT EUTRAN CGI reporting when ASN.1 for measObjectEUTRA and reportConfig-IRAT is finalized.
    1> increment the numberOfReportsSent as defined within the VarMeasReportList for this measId by 1;
    1> stop the periodical reporting timer, if running;
    1> if the numberOfReportsSent as defined within the VarMeasReportList for this measId is less than the reportAmount as defined within the corresponding reportConfig for this measId:
        2> start the periodical reporting timer with the value of reportInterval as defined within the corresponding reportConfig for this measId;
    1> else:

-continued

```
        2> if the reportType is set to periodical:
            3> remove the entry within the VarMeasReportList for this
            measId;
            3> remove this measId from the measIdList within
            VarMeasConfig;
    1> if the UE is configured with EN-DC:
        2> if SRB3 is configured:
            3> submit the MeasurementReport message via SRB3 to
            lower layers for transmission, upon which the procedure
            ends;
        2>else:
            3> submit the MeasurementReport message via the EUTRA
            MCG embedded in E-UTRA RRC message
            ULInformationTransferMRDC as specified in TS 36.331
            [10].
    1>   else:
        2>submit the MeasurementReport message to lower layers for
        transmission, upon which the procedure ends.
-------- End Excerpt ----------------------------------
```

There are problems with the existing solution. In the current version of the RRC, upon being configured to report CGI for a particular cell (PCI+measObject) and identifying that a System Information Block type 1 (SIB1) is not broadcast, the UE includes additional information about where to find a CD-SSB possibly associated with the measured SSB. More precisely, the UE reports ssb-Subcarrier-Offset and pdcch-ConfigSIB1 parameters acquired from the Master Information Block (MIB) and includes that information along with the "no SIB 1" indication, as shown in the excerpt below:

```
-------- Begin Excerpt ----------------------------------
    cgi-Info                    SEQUENCE {
        cellGlobalId            CellGlobalIdNR,
        trackingAreaCode        TrackingAreaCode,
        plmn-IdentityList       PLMN-IdentityInfoList
                                OPTIONAL,
        frequencyBandList       MultiFrequencyBandListNR
                                OPTIONAL,
        noSIB1                      SEQUENCE {
            ssb-SubcarrierOffset    INTEGER (0 . . . 15),
            pdcch-ConfigSIB1        PDCCH-ConfigSIB1
        }
                                OPTIONAL
    }
-------- End Excerpt ----------------------------------
```

The parameter ssb-SubcarrierOffset corresponds to $k_{SSB}$ (see TS 38.213), which is the frequency domain offset between an SSB and the overall resource block grid in number of subcarriers. (See TS 38.211). The value range of this field may be extended by an additional most significant bit encoded within the public broadcast channel (PBCH), as specified in TS 38.213. This field may indicate that this cell does not provide SIB1 and that there is hence no common CORESET (see TS 38.213, section 13). In this case, the field pdcch-ConfigSIB1 may indicate the frequency positions where the UE may (not) find a SS/PBCH with a control resource set and search space for SIB1 (see TS 38.213, section 13).

The parameter pdcch-ConfigSIB1 determines a bandwidth for PDCCH/SIB, a common ControlResourceSet (CORESET), a common search space and necessary PDCCH parameters. If the field ssb-SubcarrierOffset indicates that SIB1 is not present, the field pdcch-ConfigSIB1 indicates the frequency positions where the UE may find a SS/PBCH block with SIB1 or the frequency range where the network does not provide a SS/PBCH block with SIB1 (see TS 38.213, section 13).

SUMMARY

In one scenario, there are multiple SSBs (where SIB1 is not transmitted) that are associated with a single CD-SSB (possibly with a SIB1) or there is an EN-DC architecture where only Non-standalone (NSA) cells are deployed (without any associated CD-SSB). FIG. 2 shows the scenario with multiple SSBs and a single CD-SSB. Although parameters can be included in the noSIB1 information, it has not been determined whether there would be further UE actions based on that information or network actions (and problems associated with any such actions). For example, in the current specification, the UE behaves as if it had not detected CGI, so that the network is not able to immediately trigger the setup of an EN-DC X2 interface or Xn interface.

A UE may receive a CGI reporting configuration from the network to acquire the CGI of an NR Cell, acquire a first part of system information (MIB in NR standard) associated with that NR cell and detect that a second part of that system information (SIB1 in NR standard) is either not being transmitted or has an associated CD-SSB being transmitted in a frequency location that is indicated in first part of system information MIB. According to some embodiments, upon receiving a CGI configuration and detecting in the MIB that there is an associated CD-SSB, the UE may synchronize with the CD-SSB and search for a SIB1 in the CD-SSB using a PCI defined according to a specified rule (defined according to different embodiments). The rule may be, for example: use the same PCI for the NR Cell; use a PCI subsequently indicated by the network; or use a PCI acquired in the MIB of the SSB that is not the CD-SSB (i.e., in addition to the frequency location of the CD-SSB, MIB also indicates the PCI). If an SIB1 is present, the UE may acquire the SIB1 in the CD-SSB and, in particular, acquire the CGI related information (such as TAC, PLMN, cell identifier, etc.) and include them in the CGI report. Then, the UE may send a CGI report with the information. The CD-SSB system information may also contain information of other associated SSBs not providing an SIB1 that is acquired by the UE. This information may also be included in the CGI report. One advantage of the method at the UE is that it is possible to acquire the CGI in associated CD-SSBs, even if a given SSB is not transmitting in an SIB1.

A protection timer may also be defined for some of these procedures with further actions related to the CGI timer T321. The new timer T322 is started upon the detection that there is no SIB1 associated with the configured PCI, but there is an associated CD-SSB possibly with SIB1. Then, the timer T321 is stopped. Upon the expiry of the new timer T322, the UE continues the procedure to send a measurement report, which is possibly empty as the timer has expired before the UE was able to acquire the SIB1 associated with the CD-SSB.

According to some embodiments, a method, in a wireless device operating in a wireless communications network, includes receiving configuration information indicating that the wireless device is to report identifier information for a cell, the configuration information identifying a first frequency. The method also includes acquiring a first part of system information for the cell on the first frequency, using the configuration information. The method then includes determining that a second part of system information for the cell is not transmitted on the first frequency. The second part of system information for the cell is necessary for determining the identifier information. The method further includes receiving the second part of system information, including the identifier information, on a second frequency and reporting the identifier information for the cell to the wireless communications network.

According to some embodiments, a method executed by a first network node, which configures the UE to acquire the CGI of a cell that may possibly not be transmitting an SIB1, includes indicating to the UE that the UE is allowed to perform a subsequent search in a possibly associated CD-SSB, if indicated in an MIB.

According to some embodiments, a method in a network node operating in a wireless communications network, includes sending, to a wireless device, configuration information indicating that the wireless device is to report identifier information for a cell. The configuration identifies a first frequency at which at least a first part of system information for the cell may be obtained. The method includes indicating, to the wireless device, that the wireless device is permitted to perform a search for a second part of system information on a second frequency, in the event that the second part of system information for the cell is not transmitted on the first frequency. The second part of system information for the cell is necessary for determining the identifier information. The method further includes receiving, from the wireless device, the identifier information for the cell.

According to some embodiments, a method executed by a first network node and a second network node includes exchanging information regarding its NR Cells and the existence of CD-SSBs and associated SSBs (without SIB1 but pointing to that CD-SSB). That information may contain, for each CD-SSB, a list of PCIs and their frequency locations (e.g., indicated by their absolute radio-frequency channel numbers (ARFCNs) in the channel raster or synchronization raster).

According to some embodiments, a method in a first network node operating in a wireless communications network includes exchanging, with a second network node operating in the wireless communications network, information indicating frequencies for CD-SSBs associated with neighbor cells.

The methods described herein may be associated with NR Cells that may not have a SIB 1, but have a CD-SSB in another frequency location when a serving node configures the UE to report CGI. The serving node, in that case, can either be: a serving node with an NR serving cell (i.e., a gNodeB or an en-gNodeB); a serving node with an LTE serving cell connected to the Evolved Packet Core (EPC) (i.e., an eNodeB); or a serving node with an LTE serving cell connected to 5GC (i.e., a gNodeB). The method may also be applicable to LTE, if, in the future, LTE cells without SIB1 are introduced, and with an associated CD-SSB.

According to some embodiments, a wireless device configured to operate in a wireless communications network includes transceiver circuitry configured for communicating with the wireless communications network and processing circuitry operatively associated with the transceiver circuitry. The processing circuitry is configured to receive configuration information indicating that the wireless device is to report identifier information for a cell, the configuration information identifying a first frequency, and acquire a first part of system information for the cell on the first frequency, using the configuration information. The processing circuitry is also configured to determine that a second part of system information for the cell is not transmitted on the first frequency, the second part of system information for the cell being necessary for determining the identifier information. The processing circuitry is further configured to receive the second part of system information, including the identifier information, on a second frequency, and report the identifier information for the cell to the wireless communications network.

According to some embodiments, a network node configured to operate in a wireless communications network includes transceiver circuitry configured for communicating with wireless devices and processing circuitry operatively associated with the transceiver circuitry. The processing circuitry is configured to send, to a wireless device, configuration information indicating that the wireless device is to report identifier information for a cell, the configuration information identifying a first frequency at which at least a first part of system information for the cell may be obtained. The processing circuitry is also configured to indicate, to the wireless device, that the wireless device is permitted to perform a search for a second part of system information on a second frequency, in the event that the second part of system information for the cell is not transmitted on the first frequency, the second part of system information for the cell being necessary for determining the identifier information. The processing circuitry is also configured to receive, from the wireless device, the identifier information for the cell.

According to some embodiments, a first network node configured to operate in a wireless communications network includes communication circuitry configured for communicating with other network nodes and processing circuitry operatively associated with the communication circuitry and configured to exchange, with a second network node operating in the wireless communications network, information indicating frequencies for CD-SSBs associated with neighbor cells.

Further aspects of the present invention are directed to an apparatus, network node, wireless device, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

DETAILED DESCRIPTION

One of the scenarios pertaining to embodiments described herein is when multiple SSBs (transmitted without SIB1) are associated with a single CD-SSB (possibly with a SIB1). There may be some UE actions that are based on "noSIB 1" information or network actions.

According to some embodiments, a method, in a wireless device operating in a wireless communications network, includes receiving configuration information indicating that the wireless device is to report identifier information for a cell, the configuration information identifying a first frequency. The method also includes acquiring a first part of system information for the cell on the first frequency, using the configuration information. The method then includes determining that a second part of system information (e.g., SIB1) for the cell is not transmitted on the first frequency. The second part of system information for the cell is necessary for determining the identifier information. The method further includes receiving the second part of system information, including the identifier information, on a second frequency and reporting the identifier information (e.g., CGI, TAC, PLMN identity list) for the cell to the wireless communications network.

Receiving the second part of system information may include receiving a CD-SSB. The CD-SSB may include a SIB1, and the identifier information may be obtained using the SIB 1.

In one group of embodiments, the UE may rely on subsequent CGI report configurations and reports to obtain the CGI associated with an NR cell not broadcasting SIB 1.

Figure 1:
FIG. 1 illustrates measurement reporting.
Figure 2:
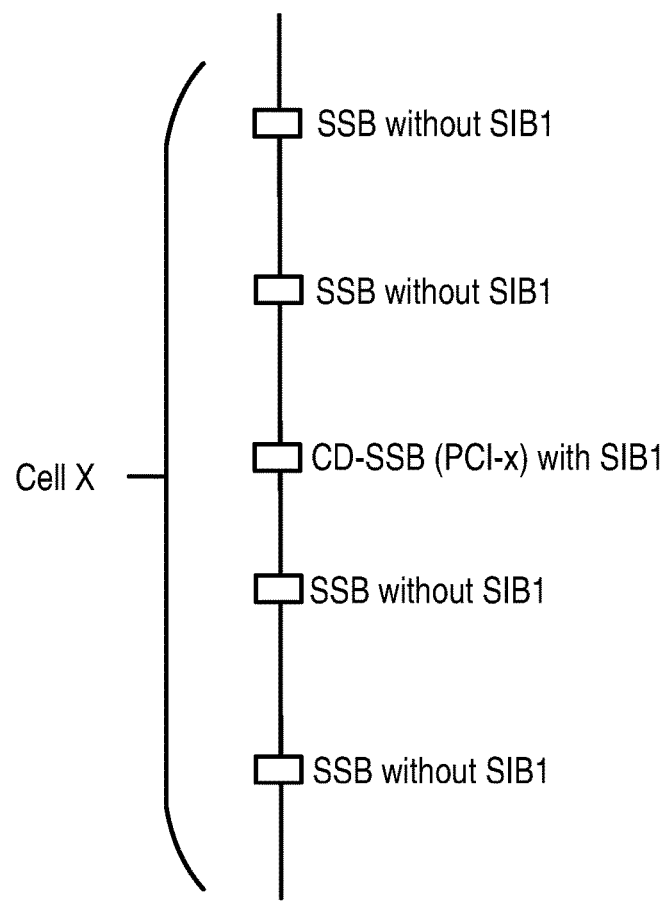
FIG. 2 illustrates a scenario where SIB1 is not transmitted and multiple SSBs (without SIB1) are associated with a single CD-SSB.
Figure 3:
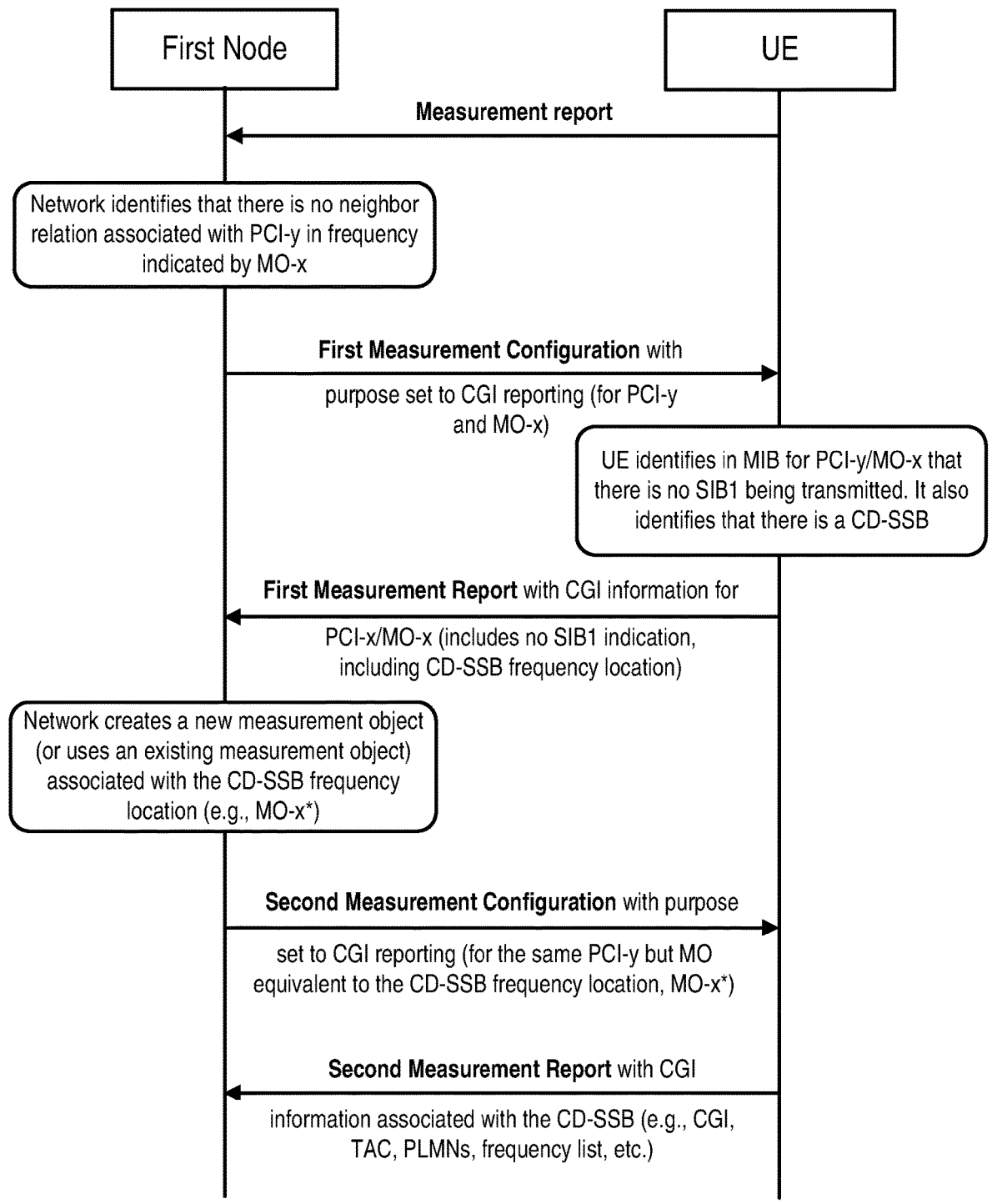
FIG. 3 illustrates a signaling diagram for a network node that receives first and second measurement reports, according to some embodiments.

In one embodiment, upon sending a first measurement report with a CGI report associated with a measurement object MO-x and a PCI-y (including an indication that there is no SIB1 associated with PCI-y on the frequency indicated by MO-x, and includes the frequency location of an associated CD-SSB), the UE receives a second measurement report configuration for a CGI associated with that same PCI-y and a new MO-x* whose SSB frequency location is the same as indicated by the frequency location of the CD-SSB (constructed by the network based on the previous measurement report with CGI report). This is shown in the signaling diagram of FIG. 3. In this embodiment, it is assumed that a CD-SSB is associated with SSBs without SIB1 have the same PCI (though they are transmitted in different frequency location) and the same CGI. Upon receiving that second (or sub-sequent) configuration, the UE tries to acquire CGI information (TACs, PLMNs, cell identities, etc.) in the SIB 1 associated with the CD-SSB. If successful, the UE includes it in a measurement report with CGI information and sends it to the network in a second measurement report.

Figure 4:
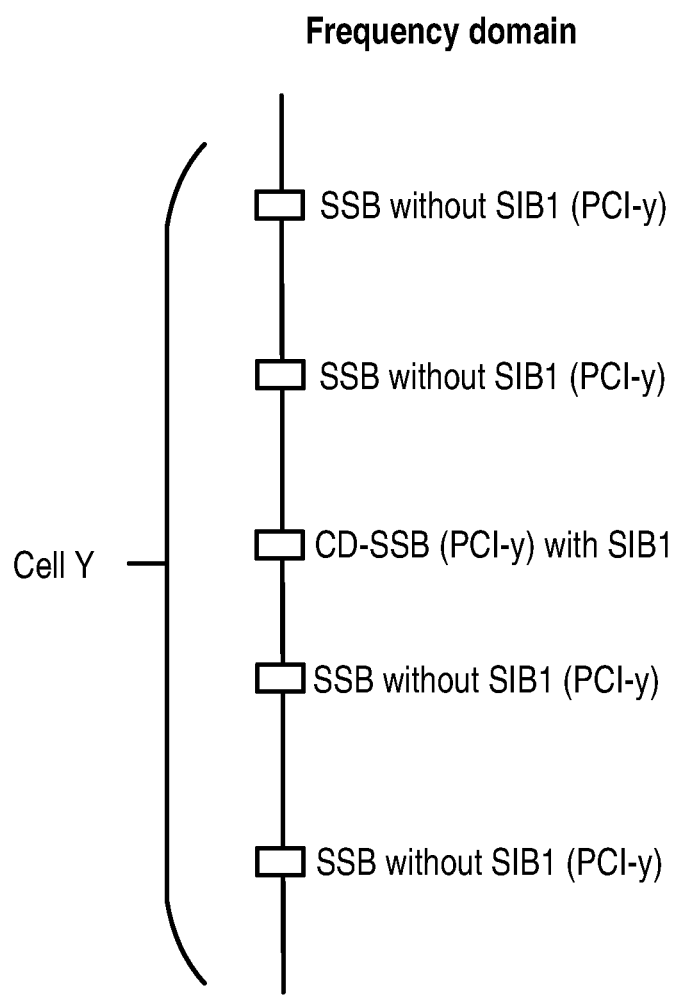
FIG. 4 illustrates another scenario where SIB1 is not transmitted and multiple SSBs (without SIB1) are associated with a single CD-SSB, according to some embodiments.

For that embodiment, on the network side, it can be assumed that the same PCI is being transmitted in different frequency locations with SSBs, without an SIB1 associated with the same CD-SSB, which also has the same PCI. Also, the same CGI may be associated with these multiple SSBs and the same as for the CD-SSB. This scenario is shown by FIG. 4.

In another embodiment, an SSB without an SIB 1 (but having an associated CD-SSB) is allowed to have a PCI that is different from the PCI of the CD-SSB. Hence, in addition to being able to derive the frequency location of the CD-SSB, the UE may also derive its PCI (e.g., by reading the CD-SSB in the MIB of the SSB without an SIB1 or by a pre-defined rule relying on some kind of PCI incrementation for CD-SSBs). The UE sends a first measurement report with a CGI report associated with a measurement object MO-x and a PCI-y. The first measurement report includes an indication that there is no SIB1 associated with PCI-y on the frequency indicated by MO-x and includes the frequency location of an associated CD-SSB. The first measurement report may include the PCI of the CD-SSB derived from the MIB of the SSB without SIB 1.

Figure 5:
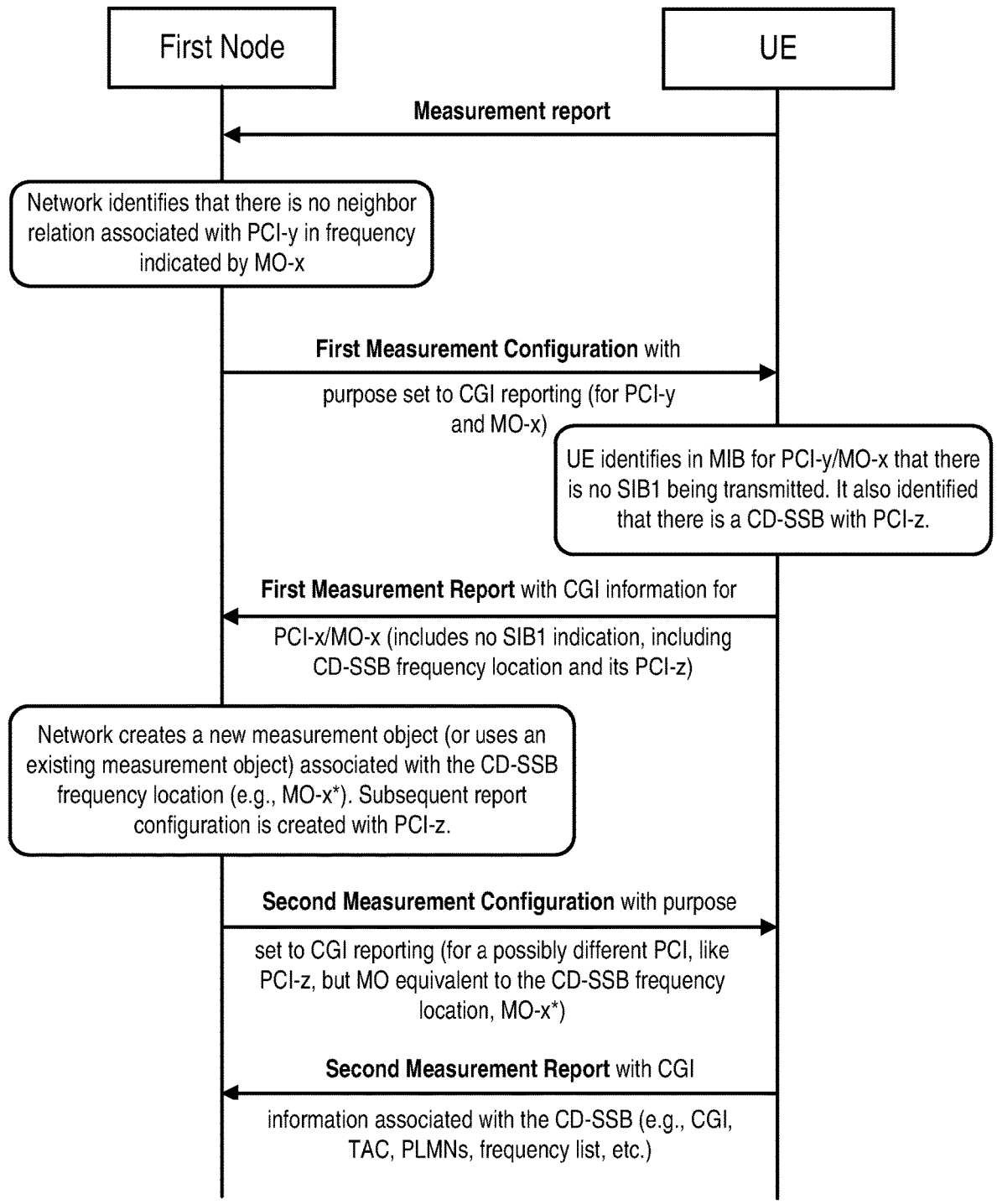
FIG. 5 illustrates another signaling diagram for a network node that receives first and second measurement reports, according to some embodiments.

Then, the UE receives a second measurement report configuration for a CGI associated with a different or the same PCI-y, depending on what has been reported in the previous CGI report, and a new MO-x* whose SSB frequency location is the same as indicated by the frequency location of the CD-SSB (constructed by the network based on the previous measurement report with CGI report). Upon receiving the second (or sub-sequent) measurement report configuration, the UE tries to acquire CGI information (TACs, PLMNs, cell identities, etc.) in the SIB1 associated with the CD-SSB. If successful, the UE includes the CGI information in a second measurement report and sends the second measurement report. FIG. 5 shows an example of this signaling.

Figure 6:
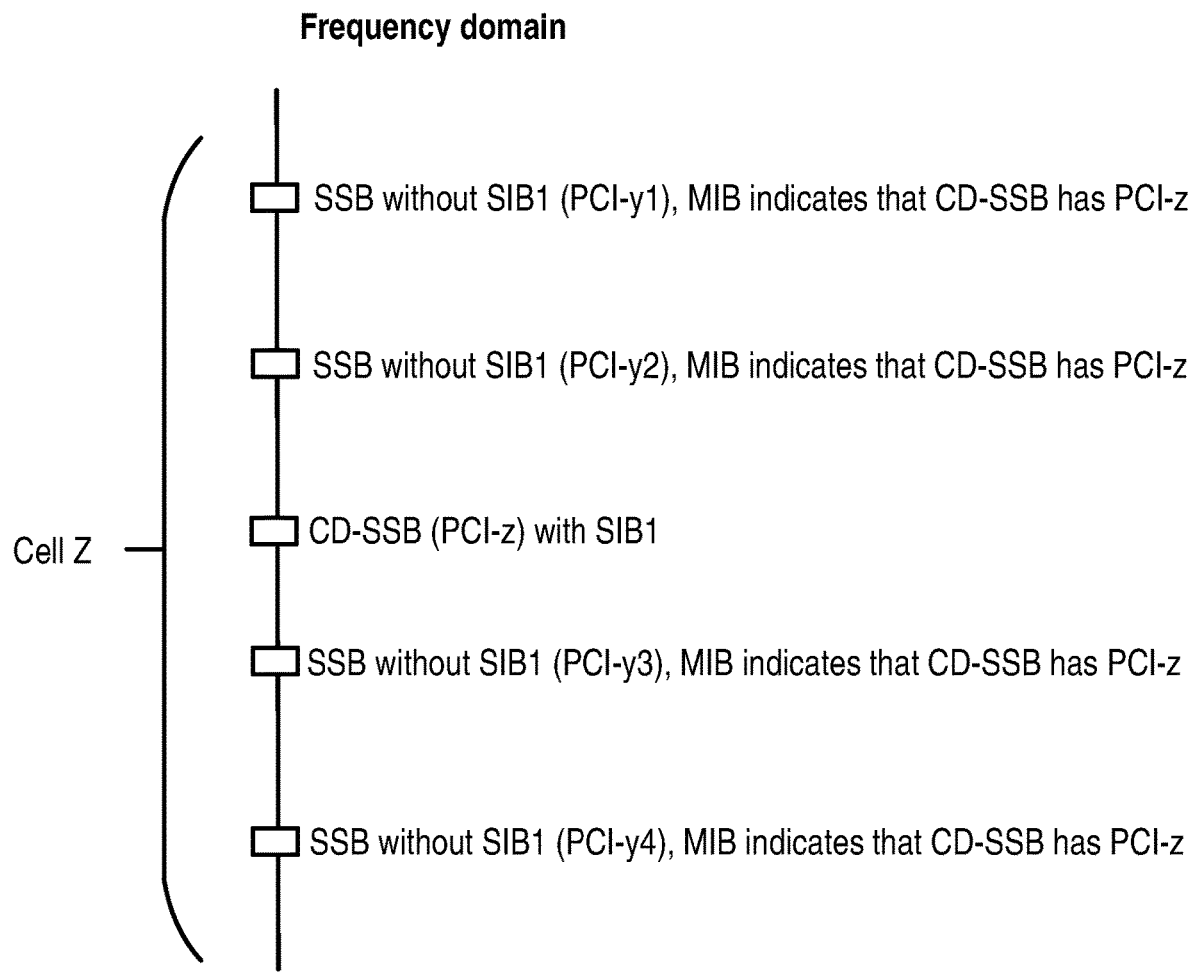
FIG. 6 illustrates another scenario where SIB1 is not transmitted and multiple SSBs (without SIB1) are associated with a single CD-SSB, according to some embodiments.

For that embodiment, on the network side, it is assumed that different PCIs may be transmitted in different frequency locations with SSBs without an SIB1 associated with the same CD-SSB (which may have a different PCI). As a single SIB1 is associated with these multiple SSBs (i.e., the SIB1 of the CD-SSB), the same CGI is associated with these multiple SSBs. FIG. 6 shows this scenario.

In this first group of embodiments, upon receiving the second measurement report configuration for acquiring the CGI of a CD-SSB, the UE may start a protection timer, such as timer T321. Then, upon acquiring the CGI related information of the CD-SSB, the UE may stop the timer. And, upon the expiry of timer T321, while it tries to acquire CGI information associated with a CD-SSB, the UE may transmit a measurement report with CGI information, if obtained.

In another group of embodiments, the method relies on a single CGI report configuration and a single report to obtain the CGI associated with an NR cell not broadcasting SIB 1. In that case, further UE actions need to be performed without a sub-sequent configuration.

Figure 7:
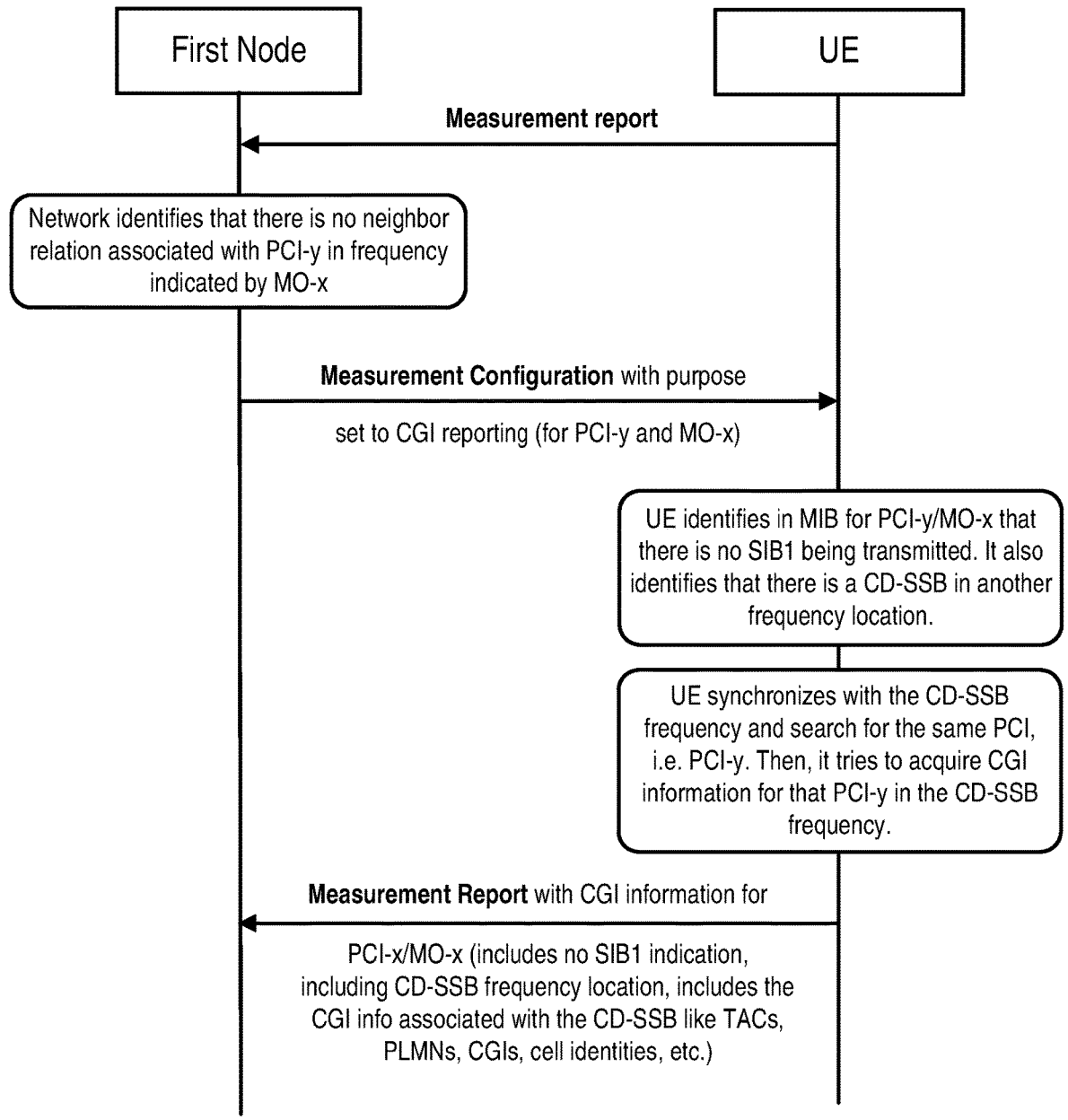
FIG. 7 illustrates a signaling diagram for a network node that receives a measurement report, according to some embodiments.

Upon being configured to report CGI associated with a measurement object MO-x and a PCI-y, the UE may detect that there is no SIB1 associated with PCI-y on the frequency indicated by MO-x. According to some embodiments, the UE, upon detecting the frequency location of an associated CD-SSB (e.g., derived from an indication transmitted in the MIB), may try to find the same PCI-y in the detected frequency location of the CD-SSB and acquire its SIB1 (possibly with some frequency tuning or autonomous measurement gaps). Then, if possible, it obtains the CGI related information associated with the CD-SSB and includes the CGI information in a measurement report that is transmitted to the network. In this embodiment, it is assumed that a CD-SSB associated with SSBs without an SIB1 having the same PCI (though they are transmitted in a different frequency location) and the same CGI. FIG. 7 shows a signaling diagram of this embodiment.

Figure 8:
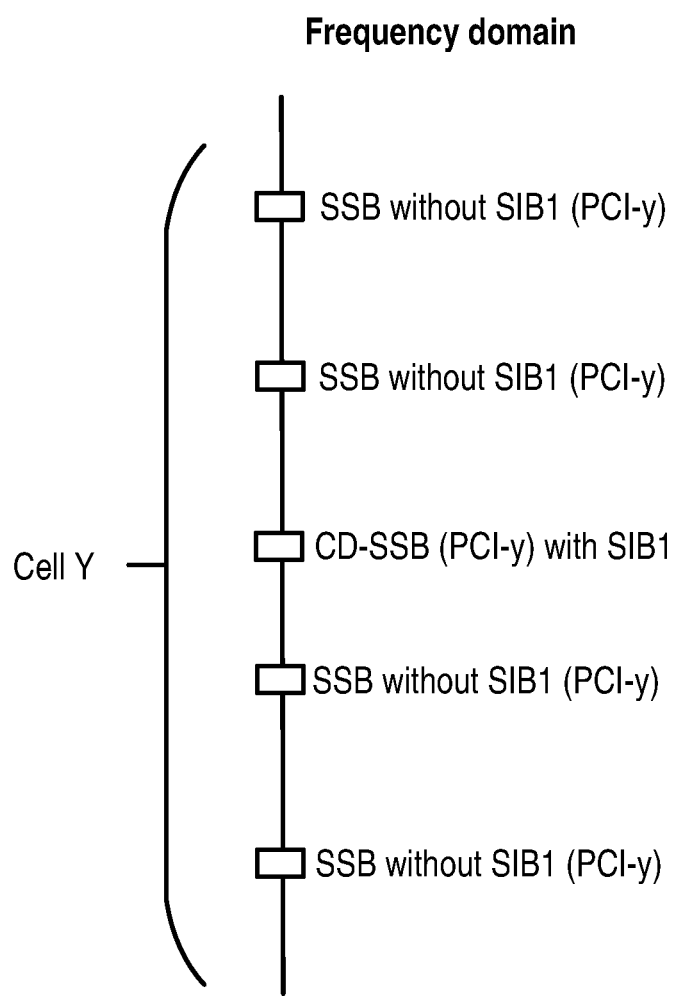
FIG. 8 illustrates another scenario where SIB1 is not transmitted and multiple SSBs (without SIB1) are associated with a single CD-SSB, according to some embodiments.

For that embodiment, on the network side, it is assumed that the same PCI is being transmitted in different frequency locations with SSBs, without an SIB1 associated with the same CD-SSB, which also has the same PCI. Also, the same CGI is associated with these multiple SSBs, same as the CD-SSB. FIG. 8 illustrates such a scenario.

Figure 9:
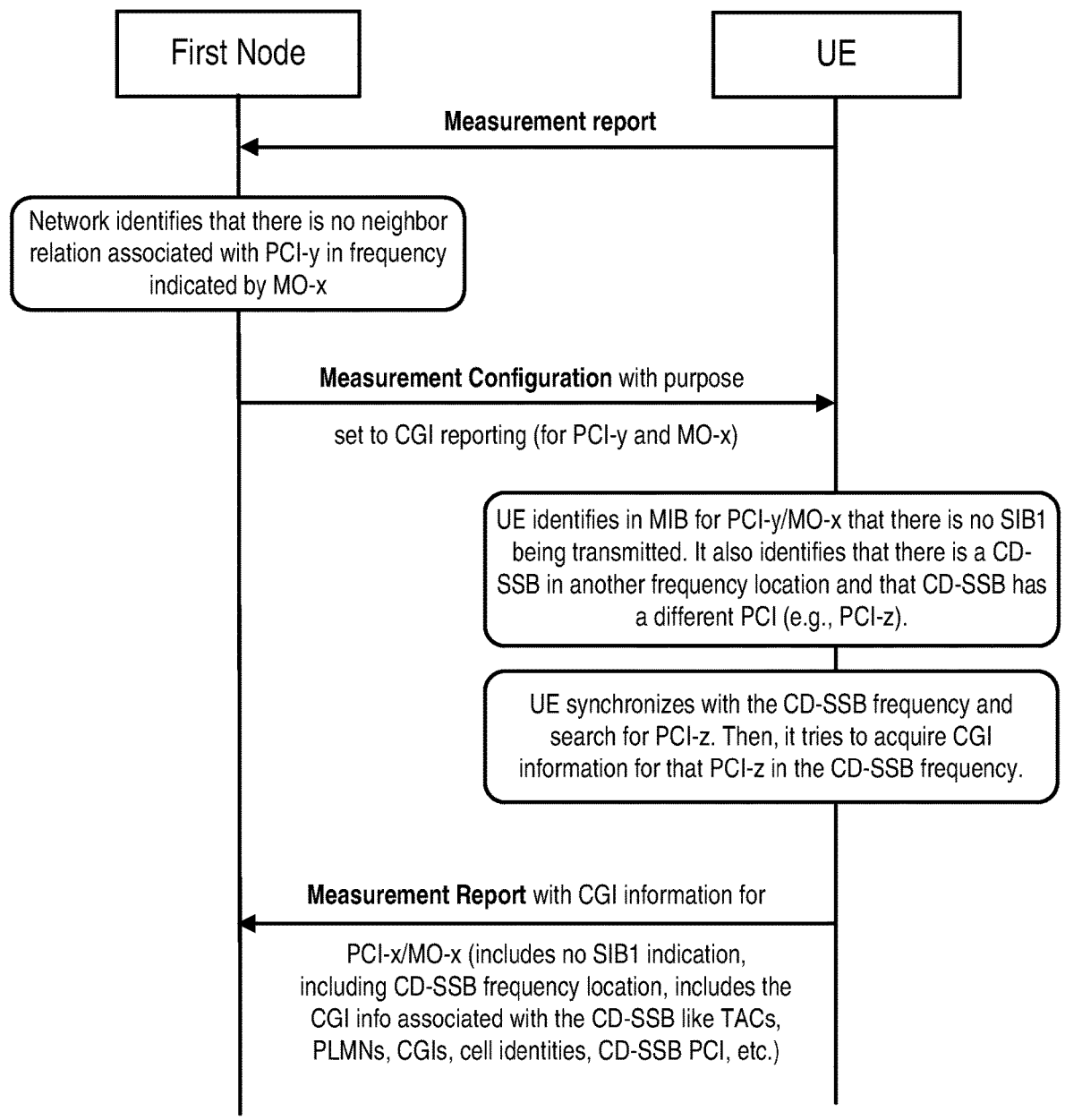
FIG. 9 illustrates another signaling diagram for a network node that receives a measurement report, according to some embodiments.

In another example method, an SSB without an SIB1 (but having an associated CD-SSB) is allowed to have a PCI that is different from the PCI of the CD-SSB. Hence, in addition to being able to derive the frequency location of the CD-SSB, the UE is also able to derive the PCI of the associated CD-SSB (e.g., by reading the CD-SSB in the MIB of the SSB without an SIB1 or by a pre-defined rule relying on some kind of PCI incrementation for CD-SSBs). Hence, upon being configured to report CGI associated with a measurement object MO-x and a PCI-y, the UE detects that there is no SIB1 associated with PCI-y on the frequency indicated by MO-x. According to some embodiments, upon detecting the frequency location of an associated CD-SSB (e.g., derive from an indication transmitted in the MIB), the UE detects the PCI of the CD-SSB (e.g., PCI-z), tries to find the PCI-z in the detected frequency location of the CD-SSB and acquire its SIB1 (possibly with some frequency tuning or autonomous measurement gaps). Then, if possible, it obtains the CGI related information associated with the CD-SSB and includes the CGI information in a measurement report that is transmitted to the network. The report also includes the PCI of the CD-SSB, which in this example is PCI-z. FIG. 9 shows a corresponding signaling diagram.

Figure 10:
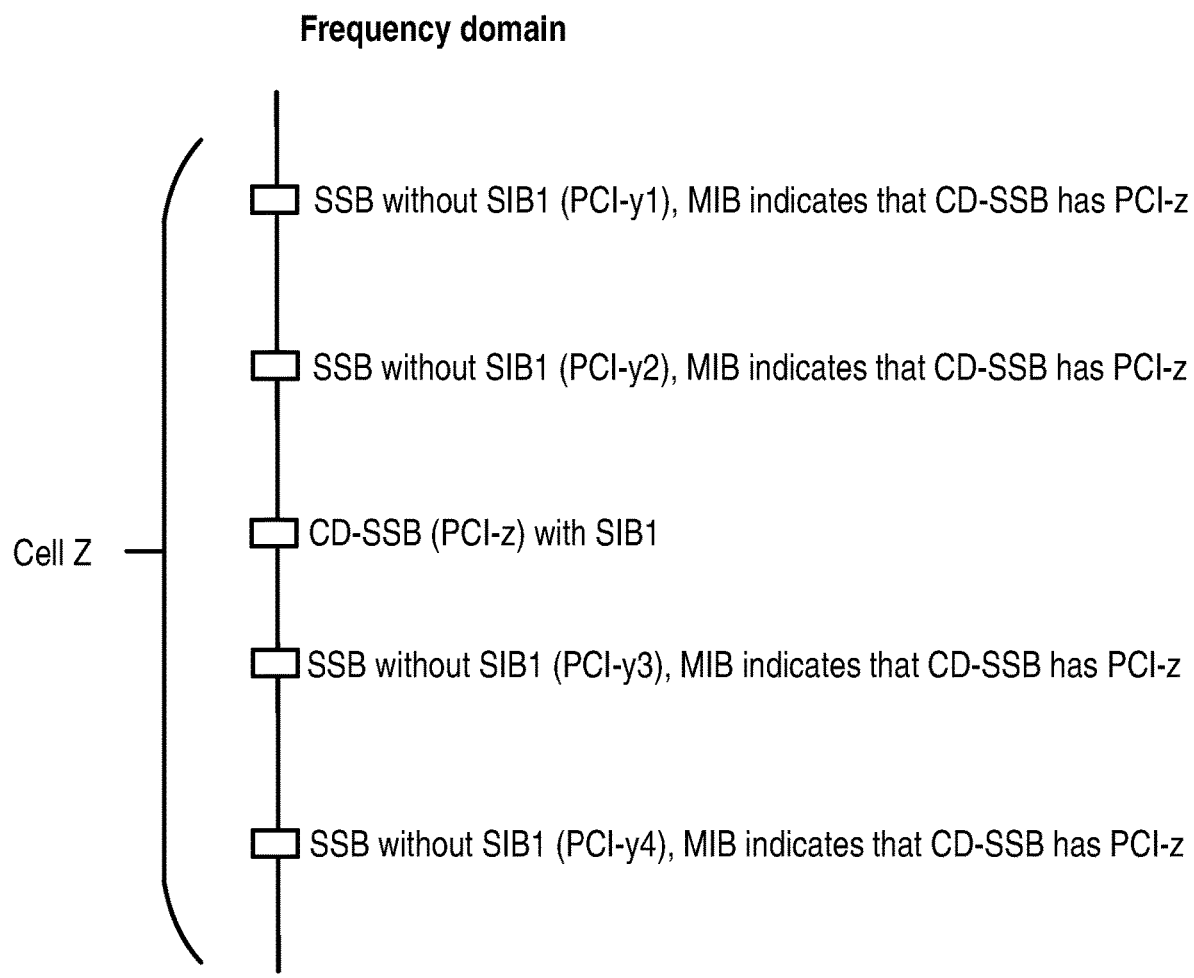
FIG. 10 illustrates another scenario where SIB1 is not transmitted and multiple SSBs (without SIB1) are associated with a single CD-SSB, according to some embodiments.

For that embodiment, on the network side, it is assumed that different PCIs may be transmitted in different frequency locations with SSBs without SIB1 associated with the same CD-SSB (which may have a different PCI). As a single SIB1 is associated with these multiple SSBs (the SIB1 of the CD-SSB), the same CGI is associated with these multiple SSBs. FIG. 10 illustrates this scenario.

In this second group of embodiments, there can be at least two different ways to handle the protection timer. In a first embodiment, upon detecting that a given cell with PCI-y/MO-x does not have an SIB1, but has a CD-SSB, the UE re-starts the timer T321 (using the same value). By re-starting the timer, the UE does not risk having T321 expire while it is trying to perform the second SIB1 acquisition that may be in another frequency, which may take additional time compared to an ordinary procedure where the PCI-y/MO-x have a SIB1 associated. Or, the network does not have to set the value of timer T321 to a too long value just to cope with that situation. Then, timer T321 stops upon the acquisition of the CGI information of the CD-SSB and the transmission of the measurement report, according to embodiments of the second group. The report is also sent in case T321 expires in this second procedure.

In another embodiment, upon detecting that a given cell with PCI-y/MO-x does not have an SIB1, but has a CD-SSB, the UE starts a timer T322 (using the same value or a different value compared to T321) and stops timer T321. In a further embodiment, a new stopping criterion is defined for timer T321 or a new timer T322. With a new starting trigger, this may be the time it starts to search for an SIB1 in the CD-SSB. The stop criteria may be defined, in the success case. A UE action upon expiry may also be defined and may be, for example, the transmission of the CGI report. The CGI report, in the case of expiry, may contain an indication that the UE performed the attempt to read an SIB1 of a CD-SSB.

By stopping the timer, the UE does not risk having timer T321 expired while it is trying to perform the second SIB1 acquisition that may be in another frequency, which may take additional time compared to an ordinary procedure where the PCI-y/MO-x have an associated SIB 1. Or, the network does not have to set the value of timer T321 to too long of a value, just to cope with that situation. Then, timer T321 stops upon the acquisition of the CGI information of the CD-SSB and the transmission of the measurement report, according to the embodiments of the second group.

Some embodiments may be related to additional information when the UE acquires CGI for a CD-SSB with multiple SSBs without an SIB1. In another embodiment, which is applicable for the first group of embodiments or the second group of embodiments, the system information of the CD-SSB includes information about a set of SSBs without an SIB1 associated with that CD-SSB. That information may include frequency locations of associated SSBs without an SIB1. That can be signaled with positive and negative shifts from the frequency of the CD-SSB or a nominal frequency location (e.g., with Absolute Radio Frequency Channel Numbers (ARFCNs) of the channel raster or sync raster). That information may also include PCIs of the associated SSBs without an SIB1.

Hence, upon acquiring system information of a CD-SSB, the UE may also acquire that information of associated SSBs without an SIB1 and include it in a measurement report (like that CGI report).

According to some embodiments, a first network node may configure the UE to acquire the CGI of a cell that may possibly not be transmitting SIB1. The first network node may be configured to indicate to the UE that the UE is allowed to perform a subsequent search in a possibly associated CD-SSB, if indicated in MIB.

That may be mainly applicable for the second group of embodiments, where the UE is not required to receive the sub-sequent CGI reporting configuration in order to acquire the CGI information associated with the CD-SSB. That indication may be part of the reportConfig, in particular as part of the CGIreport configuration. It can simply be a TRUE/FALSE Boolean flag. The indication from the network may also contain a value for the new timer T322.

According to some embodiments, a first network node and/or a second network node may be configured to exchange information regarding its NR Cells and the existence of CD-SSBs and associated SSBs (without an SIB1 but pointing to that CD-SSB). That information may contain, for each CD-SSB, a list of PCIs and their frequency locations (e.g., indicated by their ARFCNs in the channel raster or synchronization raster).

That information can be exchanged during the Xn or X2 setup. For example, it can be provided as part of served cell information, in any of the following messages: X2 SETUP REQUEST, X2 EN-DC SETUP REQUEST, Xn SETUP REQUEST or X2 SETUP RESPONSE, X2 EN-DC SETUP RESPONSE, Xn SETUP RESPONSE.

Figure 11:
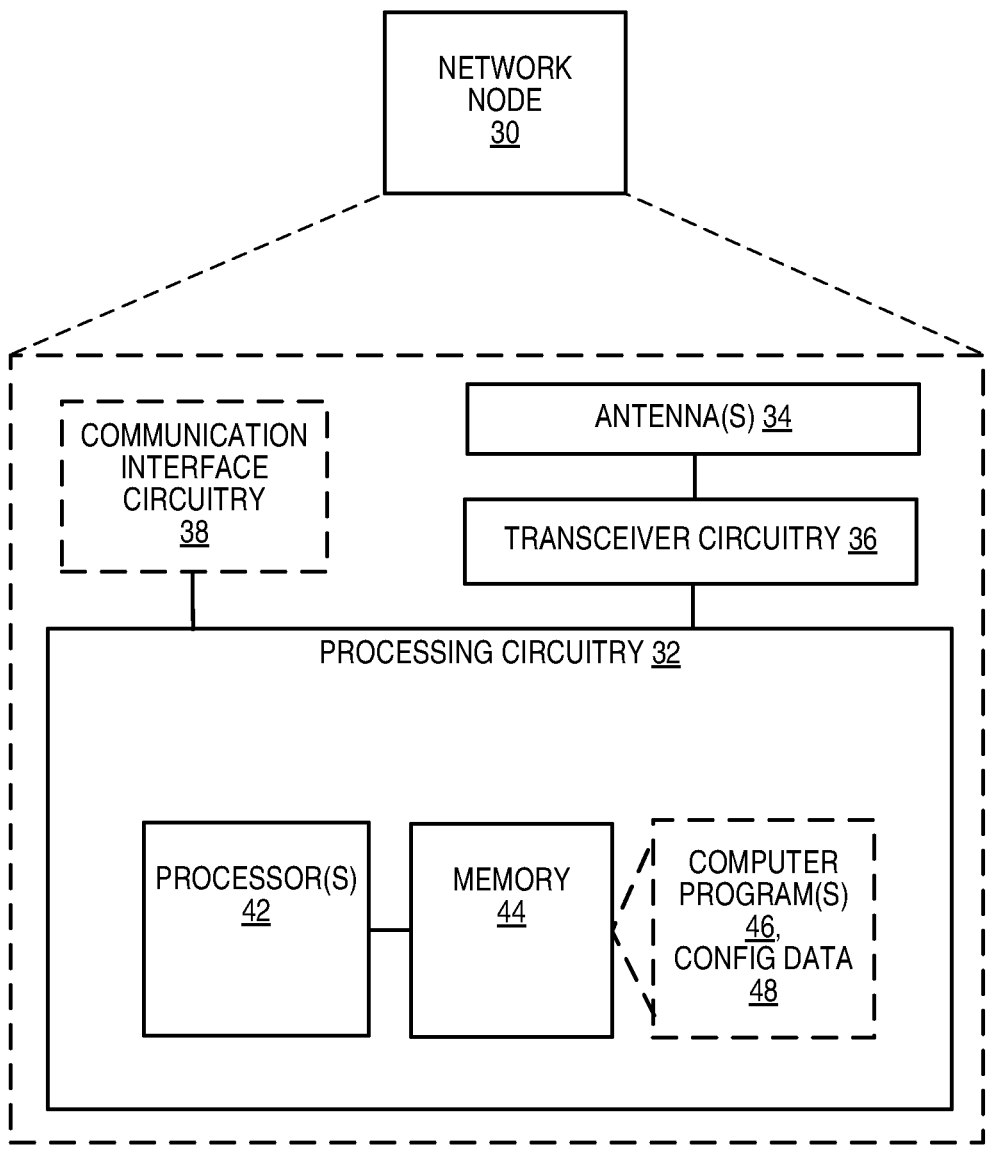
FIG. 11 illustrates is a block diagram of a network node, according to some embodiments.

FIG. 11 shows a network node 30, which may be one of the one or more nodes that are configured to carry out one or more of these disclosed techniques. The network node 30 may be an evolved Node B (eNodeB), Node B or gNB. While a network node 30 is shown in FIG. 11, the network node operations can be performed by other kinds of network access nodes or relay nodes. In the non-limiting embodiments described below, the network node 30 will be described as being configured to operate as a cellular network access node in an LTE network or NR network.

Those skilled in the art will readily appreciate how each type of node may be adapted to carry out one or more of the methods and signaling processes described herein, e.g., through the modification of and/or addition of appropriate program instructions for execution by processing circuits 32.

The network node 30 facilitates communication between wireless terminals, other network access nodes and/or the core network. The network node 30 may include communication interface circuitry 38 that includes circuitry for communicating with other nodes in the core network, radio nodes, and/or other types of nodes in the network for the purposes of providing data and/or cellular communication services. The network node 30 communicates with wireless devices using antennas 34 and transceiver circuitry 36. The transceiver circuitry 36 may include transmitter circuits, receiver circuits, and associated control circuits that are collectively configured to transmit and receive signals according to a radio access technology, for the purposes of providing cellular communication services.

The network node 30 also includes one or more processing circuits 32 that are operatively associated with the transceiver circuitry 36 and, in some cases, the communication interface circuitry 38. The processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 44 comprises any one or more of SRAM, DRAM, EEPROM, and FLASH memory, which may be in the processing circuitry 32 and/or separate from the processing circuitry 32. The memory 44 may also store any configuration data 48 used by the network access node 30. The processing circuitry 32 may be configured, e.g., through the use of appropriate program code stored in memory 44, to carry out one or more of the methods and/or signaling processes detailed hereinafter.

The network node 30, alone or in coordination with other network nodes, operate in a wireless network that serves a plurality of wireless devices, or UEs. The processing circuitry 32 of the network node 30 is configured, according to some embodiments, to send, to a wireless device, configuration information indicating that the wireless device is to report identifier information for a cell, the configuration information identifying a first frequency at which at least a first part of system information for the cell may be obtained. The processing circuitry 32 is also configured to, indicate, to the wireless device, that the wireless device is permitted to perform a search for a second part of system information on a second frequency, in the event that the second part of system information for the cell is not transmitted on the first frequency, the second part of system information for the cell being necessary for determining the identifier information. The processing circuitry 32 is also configured to receive, from the wireless device, the identifier information for the cell.

Figure 12:
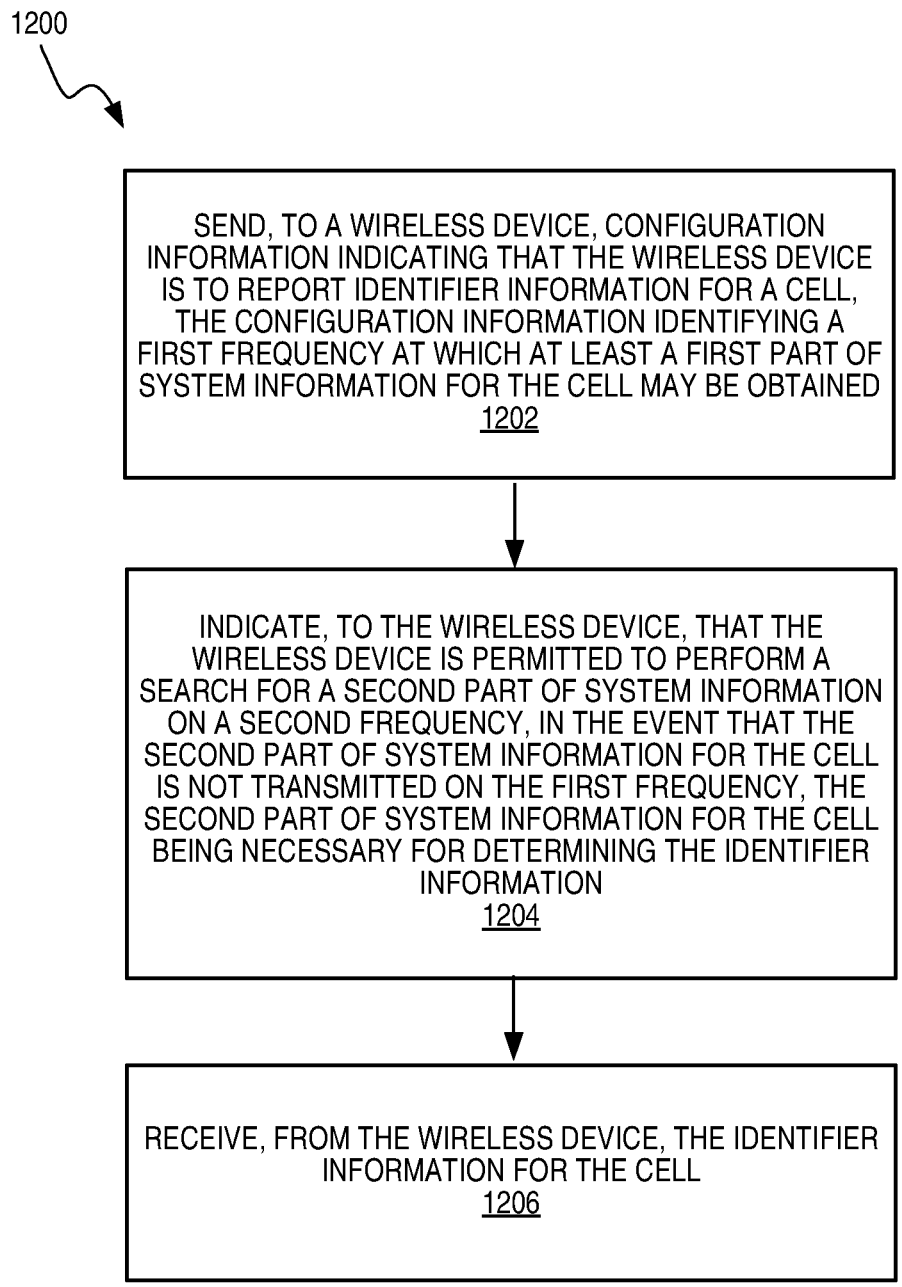
FIG. 12 illustrates a flow diagram of a method at the network node, according to some embodiments.

The processing circuitry 32 is also configured to perform a corresponding method, such as method 1200 in FIG. 12. The method 1200 includes sending, to a wireless device, configuration information indicating that the wireless device is to report identifier information for a cell, the configuration information identifying a first frequency at which at least a first part of system information for the cell may be obtained (block 1202). The method 1200 also includes indicating, to the wireless device, that the wireless device is permitted to perform a search for a second part of system information on a second frequency, in the event that the second part of system information for the cell is not transmitted on the first frequency, the second part of system information for the cell being necessary for determining the identifier information (block 1204). The method 1200 further includes receiving, from the wireless device, the identifier information for the cell (block 1206). The identifier information may include a CGI for the cell. The identifier information may include a TAC or a PLMN identity list, or both.

In other embodiments, the processing circuitry 32 is configured to exchange, with a second network node operating in the wireless communications network, information indicating frequencies for CD-SSBs associated with neighbor cells.

Figure 13:
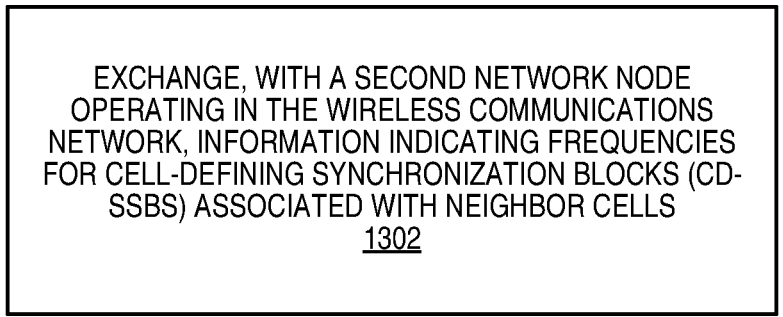
FIG. 13 illustrates is a block diagram of a wireless device, according to some embodiments.

The processing circuitry 32 is also configured to perform a corresponding method, such as method 1300 in FIG. 13. The method 1300 includes exchanging, with a second network node operating in the wireless communications network, information indicating frequencies for CD-SSBs associated with neighbor cells (block 1302).

Figure 14:
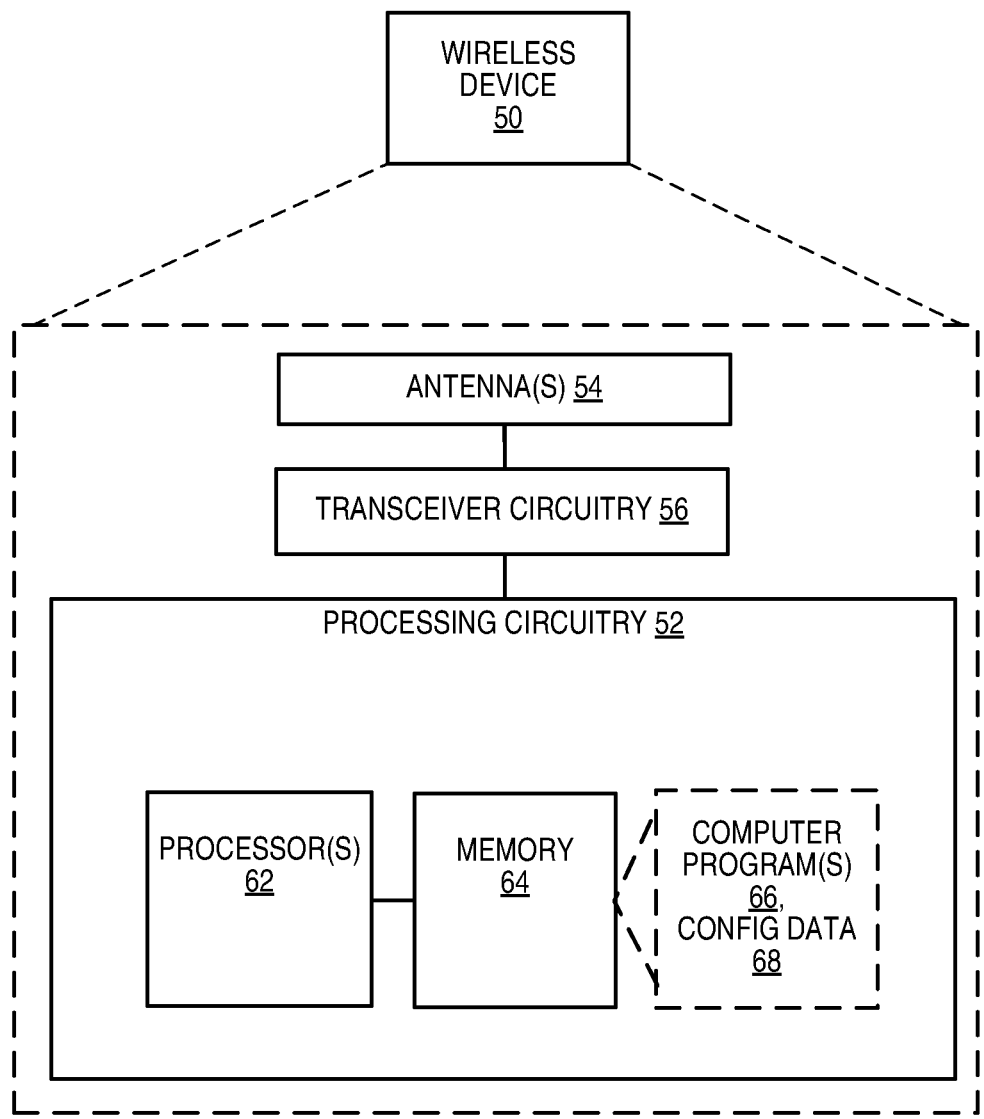
FIG. 14 illustrates a flow diagram of a method at the wireless device, according to some embodiments.

FIG. 14 illustrates a diagram of a wireless device 50 that is configured to carry out one or more of the disclosed techniques, according to some embodiments. The wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The wireless device 50 is configured to communicate with a network node or base station in a wide-area cellular network via antennas 54 and transceiver circuitry 56. The transceiver circuitry 56 may include transmitter circuits, receiver circuits, and associated control circuits that are collectively configured to transmit and receive signals according to a radio access technology, for the purposes of using cellular communication services. This radio access technologies are NR and LTE for the purposes of this discussion.

The wireless device 50 also includes one or more processing circuits 52 that are operatively associated with the radio transceiver circuitry 56. The processing circuitry 52 comprises one or more digital processing circuits 62, e.g., one or more microprocessors, microcontrollers, DSPs, FPGAs, CPLDs, ASICs, or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 52 and/or separate from processing circuitry 52. The memory 64 may also store any configuration data 68 used by the wireless device 50. The processing circuitry 52 may be configured, e.g., through the use of appropriate program code stored in memory 64, to carry out one or more of the methods and/or signaling processes detailed hereinafter.

The processing circuitry 52 of the wireless device 50 is configured, according to some embodiments, to receive, from the wireless network via the transceiver circuitry 56, configuration information indicating that the wireless device is to report identifier information for a cell, the configuration information identifying a first frequency. The processing circuitry 52 is also configured to acquire a first part of system information for the cell on the first frequency, using the configuration information. The processing circuitry 52 is configured to determine that a second part of system information for the cell is not transmitted on the first frequency. The second part of system information for the cell is necessary for determining the identifier information. The processing circuitry 52 is also configured to receive the second part of system information, including the identifier information, on a second frequency and report the identifier information for the cell to the wireless communications network.

Figure 15:
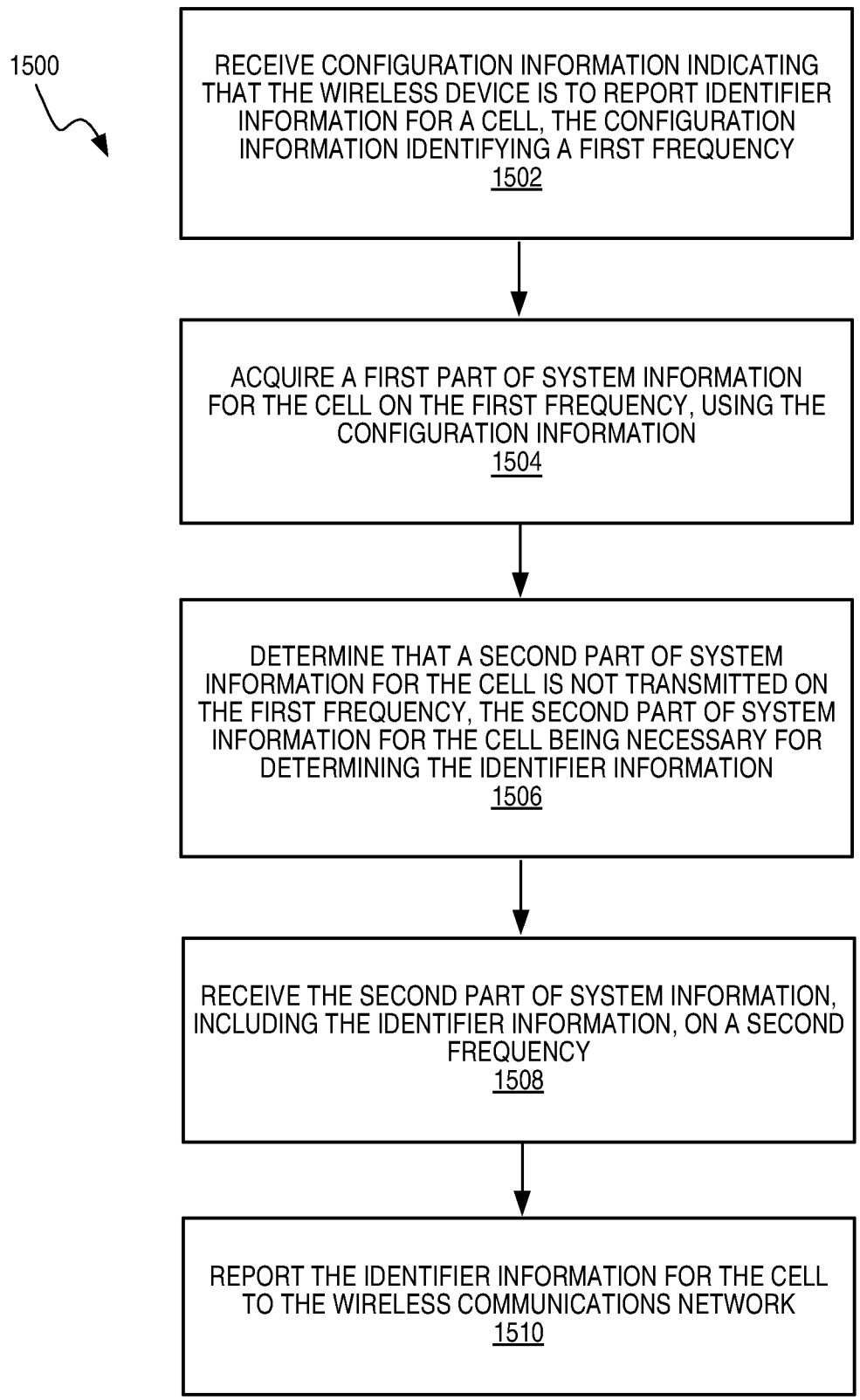
FIG. 15 schematically illustrates a telecommunication network connected via an intermediate network to a host computer, according to some embodiments.

The processing circuitry 52 is also configured to perform a corresponding method, such as method 1500 shown in FIG. 15. The method 1500 includes receiving configuration information indicating that the wireless device is to report identifier information for a cell, the configuration information identifying a first frequency (block 1502) and receiving a first part of system information for the cell on the first frequency, using the configuration information (block 1504). The method 1500 also includes determining that a second part of system information for the cell is not transmitted on the first frequency, the second part of system information for the cell being necessary for determining the identifier information (block 1506). The method 1500 also includes receiving the second part of system information, including the identifier information, on a second frequency (block 1508), and reporting the identifier information for the cell to the wireless communications network (block 1510).

The identifier information may include a CGI for the cell. The identifier information may further include a TAC or a PLMN identity list, or both.

In some embodiments, determining that the second part of system information for the cell is not transmitted on the first frequency includes determining that SIB1 for the cell is not transmitted on the first frequency.

In some embodiments, receiving the second part of system information includes receiving a CD-SSB. The CD-SSB may include an SIB1, and the method 1500 may include obtaining the identifier information using the SIB 1.

The method 1500 may further include, after determining that the second part of system information for the cell containing identifier information for the cell is not transmitted on the first frequency, sending a first report to the wireless communications network. The first report may indicate that the second part of system information for the cell containing identifier information for the cell is not transmitted on the first frequency. The method 1500 may also include, after sending the first report, receiving additional configuration information indicating at least the second frequency.

In some embodiments, the receiving of the second part of system information for the cell may be performed using a PCI identical to that used for said receiving the first part of system information for the cell. In other embodiments, the receiving of the second part of system information for the cell may be performed using a different PCI from that used for the receiving of the first part of system information for the cell. The different PCI may be indicated by the additional configuration information. In some embodiments, the receiving of the second part of system information for the cell may be performed using a different PCI from that used for the receiving of the first part of system information for the cell. The different PCI may be derived by the wireless device according to a predetermined rule.

In some embodiments, the method 1500 may further include determining the second frequency from the first part of system information for the cell. The method may include determining, from the first part of system information for the cell, a PCI for the receiving of the second part of system information for the cell. The method 1500 may further include deriving a PCI for the receiving of the second part of system information for the cell from a different PCI used for the receiving of the first part of system information for the cell.

In some embodiments, the method 1500 includes, responsive to determining that the second part of system information for the cell is not transmitted on the first frequency, re-starting a timer that limits time spent searching for the identifier information for the cell.

The method 1500 may include, responsive to determining that the second part of system information for the cell is not transmitted on the first frequency, initiating a timer that limits time spent searching for the identifier information for the cell.

In some embodiments, the receiving of the second part of system information may include receiving a CD-SSB and the method 1500 may further include obtaining a frequency location for an SSB associated with the cell, from the CD-SSB and reporting the obtained frequency location to the wireless communications network. The method 1500 may further include obtaining a physical cell identifier of the SSB associated with the cell, from the CD-SSB and reporting the obtained PCI of the SSB associated with the cell.

Figure 16:
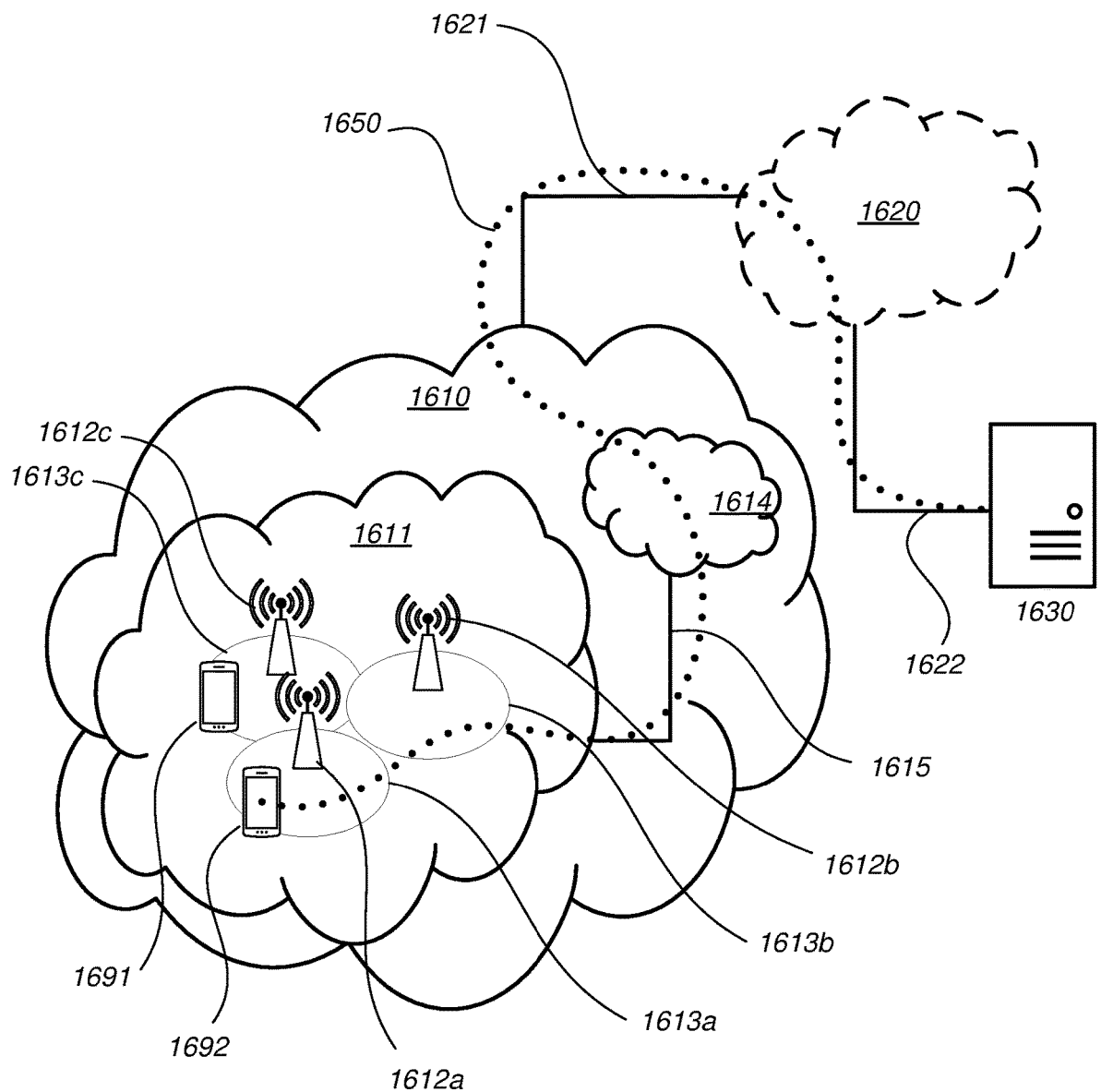
FIG. 16 is a generalized block diagram of a host computer communicating via a base station with a user equipment over a partially wireless connection, according to some embodiments.

FIG. 16, according to some embodiments, illustrates a communication system that includes a telecommunication network 1610, such as a 3GPP-type cellular network, which comprises an access network 1611, such as a radio access network, and a core network 1614. The access network 1611 comprises a plurality of base stations 1612*a*, 1612*b*, 1612*c*, such as NBs, eNBs, gNBs or other types of wireless access points, each defining a corresponding coverage area 1613*a*, 1613*b*, 1613*c*. Each base station 1612*a*, 1612*b*, 1612*c* is connectable to the core network 1614 over a wired or wireless connection 1615. A first UE 1691 located in coverage area 1613*c* is configured to wirelessly connect to, or be paged by, the corresponding base station 1612*c*. A second UE 1692 in coverage area 1613*a* is wirelessly connectable to the corresponding base station 1612*a*. While a plurality of UEs 1691, 1692 are illustrated in this example, the disclosed embodiments are equally applicable to a situation where a sole UE is in the coverage area or where a sole UE is connecting to the corresponding base station 1612.

The telecommunication network 1610 is itself connected to a host computer 1630, which may be embodied in the hardware and/or software of a standalone server, a cloud-implemented server, a distributed server or as processing resources in a server farm. The host computer 1630 may be under the ownership or control of a service provider, or may be operated by the service provider or on behalf of the service provider. The connections 1621, 1622 between the telecommunication network 1610 and the host computer 1630 may extend directly from the core network 1614 to the host computer 1630 or may go via an optional intermediate network 1620. The intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system of FIG. 16 as a whole enables connectivity between one of the connected UEs 1691, 1692 and the host computer 1630. The connectivity may be described as an over-the-top (OTT) connection 1650. The host computer 1630 and the connected UEs 1691, 1692 are configured to communicate data and/or signaling via the OTT connection 1650, using the access network 1611, the core network 1614, any intermediate network 1620 and possible further infrastructure (not shown) as intermediaries. The OTT connection 1650 may be transparent in the sense that the participating communication devices through which the OTT connection 1650 passes are unaware of routing of uplink and downlink communications. For example, a base station 1612 may not or need not be informed about the past routing of an incoming downlink communication with data originating from a host computer 1630 to be forwarded (e.g., handed over) to a connected UE 1691. Similarly, the base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In a communication system 1700, a host computer 1710 comprises hardware 1715 including a communication interface 1716 configured to set up and maintain a wired or wireless connection with an interface of a different communication device of the communication system 1700. The host computer 1710 further comprises processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as a UE 1730 connecting via an OTT connection 1750 terminating at the UE 1730 and the host computer 1710. In providing the service to the remote user, the host application 1712 may provide user data which is transmitted using the OTT connection 1750.

The communication system 1700 further includes a base station 1720 provided in a telecommunication system and comprising hardware 1725 enabling it to communicate with the host computer 1710 and with the UE 1730. The hardware 1725 may include a communication interface 1726 for setting up and maintaining a wired or wireless connection with an interface of a different communication device of the communication system 1700, as well as a radio interface 1727 for setting up and maintaining at least a wireless connection 1770 with a UE 1730 located in a coverage area (not shown in FIG. 17) served by the base station 1720. The communication interface 1726 may be configured to facilitate a connection 1760 to the host computer 1710. The connection 1760 may be direct or it may pass through a core network (not shown in FIG. 17) of the telecommunication system and/or through one or more intermediate networks outside the telecommunication system. In the embodiment shown, the hardware 1725 of the base station 1720 further includes processing circuitry 1728, which may comprise one or more programmable processors, application-specific integrated circuits, field programmable gate arrays or combinations of these (not shown) adapted to execute instructions. The base station 1720 further has software 1721 stored internally or accessible via an external connection.

The communication system 1700 further includes the UE 1730 already referred to. Its hardware 1735 may include a radio interface 1737 configured to set up and maintain a wireless connection 1770 with a base station serving a coverage area in which the UE 1730 is currently located. The hardware 1735 of the UE 1730 further includes processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1710. In providing the service to the user, the client application 1732 may receive request data from the host application 1712 and provide user data in response to the request data. The OTT connection 1750 may transfer both the request data and the user data. The client application 1732 may interact with the user to generate the user data that it provides.

Figure 17:
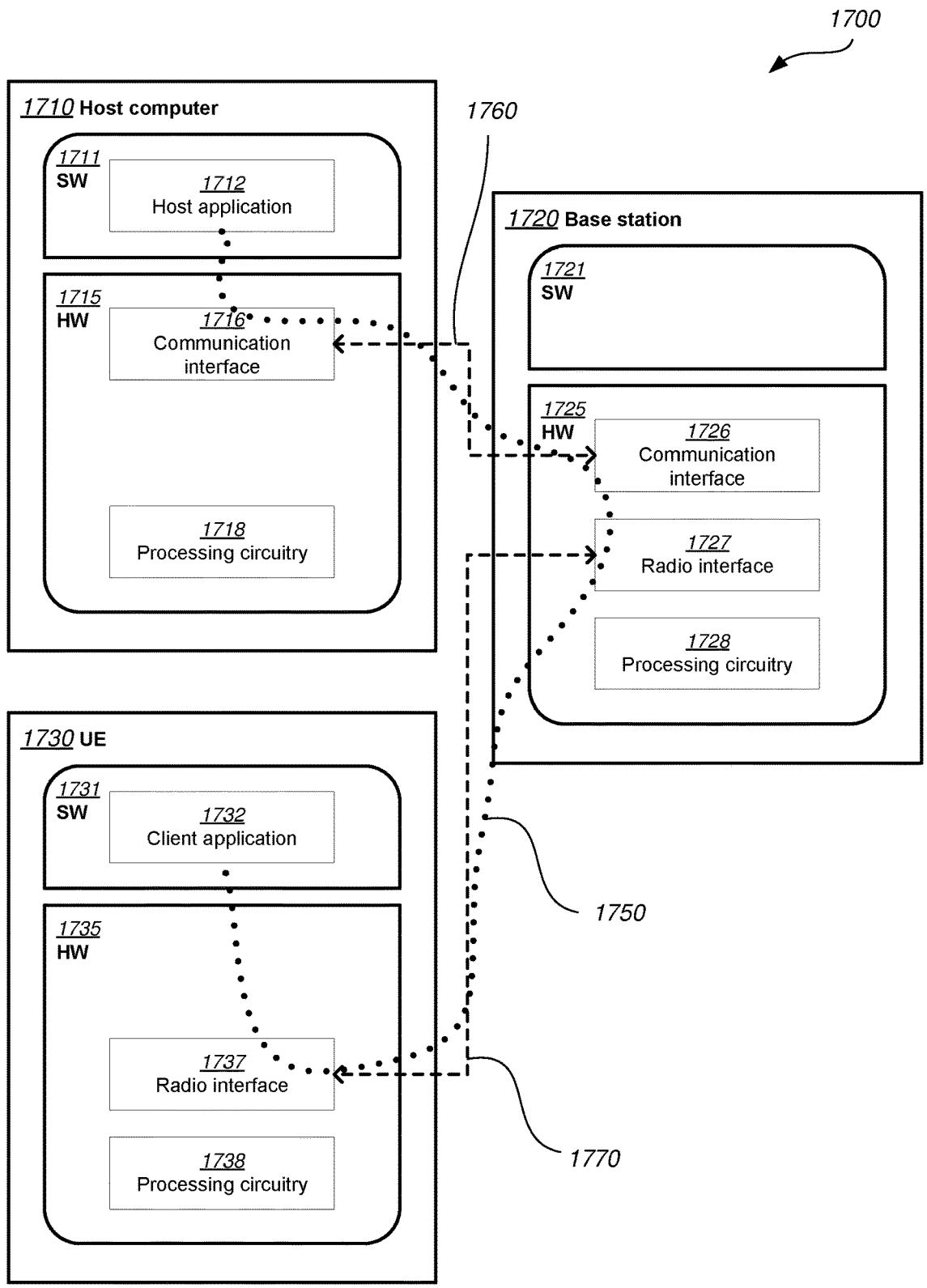
FIGS. 17 to 21 are flowcharts illustrating example methods implemented in a communication system including a host computer, a base station and a user equipment.

It is noted that the host computer 1710, base station 1720 and UE 1730 illustrated in FIG. 17 may be identical to the host computer 1630, one of the base stations 1612a, 1612b, 1612c and one of the UEs 1691, 1692 of FIG. 16, respectively. This is to say, the inner workings of these entities may be as shown in FIG. 17 and independently, the surrounding network topology may be that of FIG. 16.

In FIG. 17, the OTT connection 1750 has been drawn abstractly to illustrate the communication between the host computer 1710 and the use equipment 1730 via the base station 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further take decisions by which it dynamically changes the routing (e.g., on the basis of load balancing consideration or reconfiguration of the network).

The wireless connection 1770 between the UE 1730 and the base station 1720 is in accordance with the teachings of the embodiments described throughout this disclosure, such as provided by nodes such as wireless device 50 and network node 30, along with the corresponding methods 1200, 1300 and 1500. The embodiments discussed herein make it possible to acquire the CGI in associated CD-SSBs, even if a given SSB is not transmitting an SIB 1. The teachings of these embodiments may improve the data rate, capacity, latency and/or power consumption for the network and UE 1730 using the OTT connection 1750 and thereby provide benefits such as reduced user waiting time, more capacity, better responsiveness, and better device battery time.

A measurement procedure may be provided for the purpose of monitoring data rate, latency and other factors on which the one or more embodiments improve. There may further be an optional network functionality for reconfiguring the OTT connection 1750 between the host computer 1710 and UE 1730, in response to variations in the measurement results. The measurement procedure and/or the network functionality for reconfiguring the OTT connection 1750 may be implemented in the software 1711 of the host computer 1710 or in the software 1731 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of the OTT connection 1750 may include message format, retransmission settings, preferred routing etc.; the reconfiguring need not affect the base station 1720, and it may be unknown or imperceptible to the base station 1720. Such procedures and functionalities may be known and practiced in the art. In certain embodiments, measurements may involve proprietary UE signaling facilitating the host computer's 1710 measurements of throughput, propagation times, latency and the like. The measurements may be implemented in that the software 1711, 1731 causes messages to be transmitted, in particular empty or 'dummy' messages, using the OTT connection 1750 while it monitors propagation times, errors etc.

Figures 18, 19:
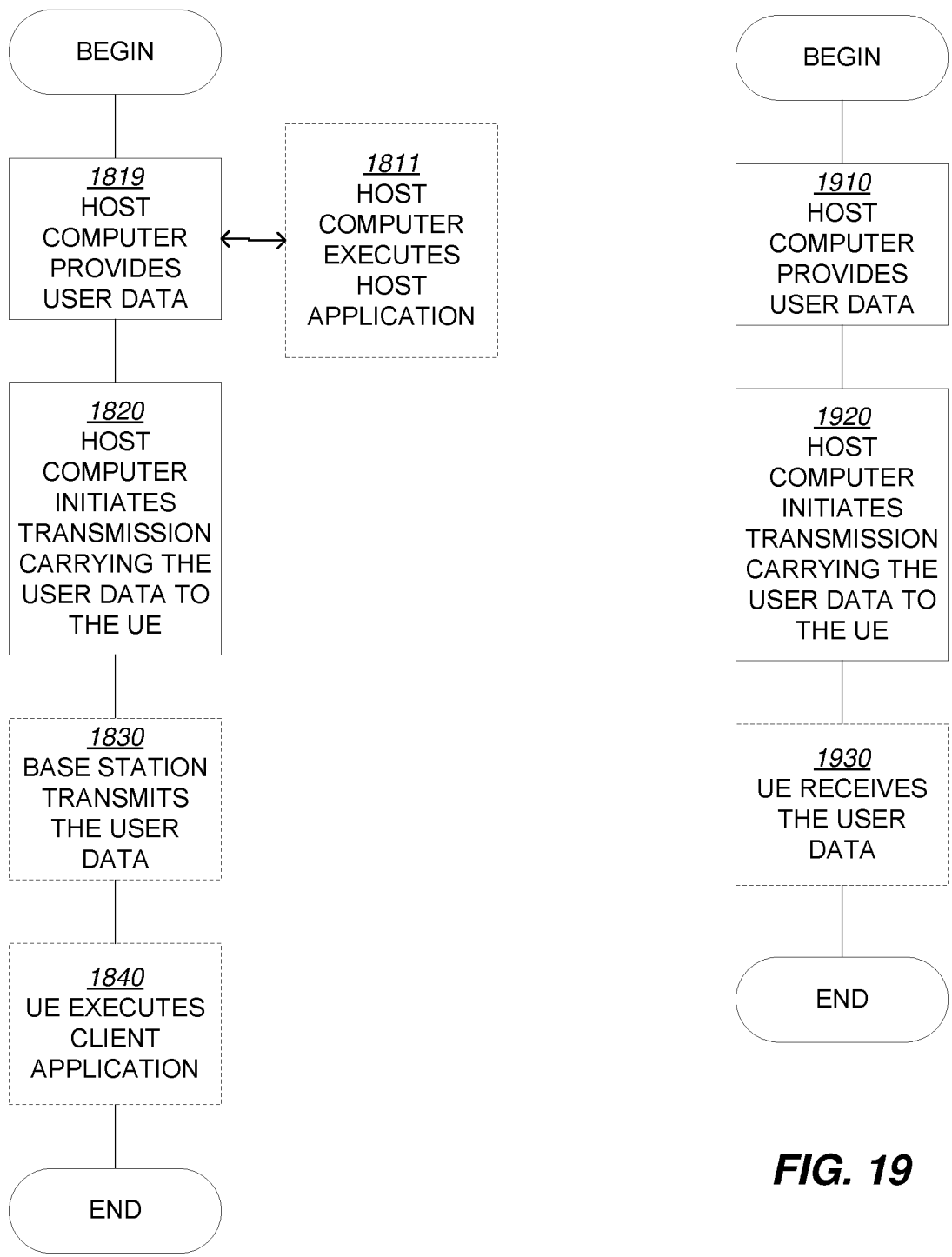

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In a first step 1810 of the method, the host computer provides user data. In an optional substep 1811 of the first step 1810, the host computer provides the user data by executing a host application. In a second step 1820, the host computer initiates a transmission carrying the user data to the UE. In an optional third step 1830, the base station transmits to the UE the user data which was carried in the transmission that the host computer initiated, in accordance with the teachings of the embodiments described throughout this disclosure. In an optional fourth step 1840, the UE executes a client application associated with the host application executed by the host computer.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In a first step 1910 of the method, the host computer provides user data. In an optional substep (not shown) the host computer provides the user data by executing a host application. In a second step 1920, the host computer initiates a transmission carrying the user data to the UE. The transmission may pass via the base station, in accordance with the teachings of the embodiments described throughout this disclosure. In an optional third step 1930, the UE receives the user data carried in the transmission.

Figures 20, 21:
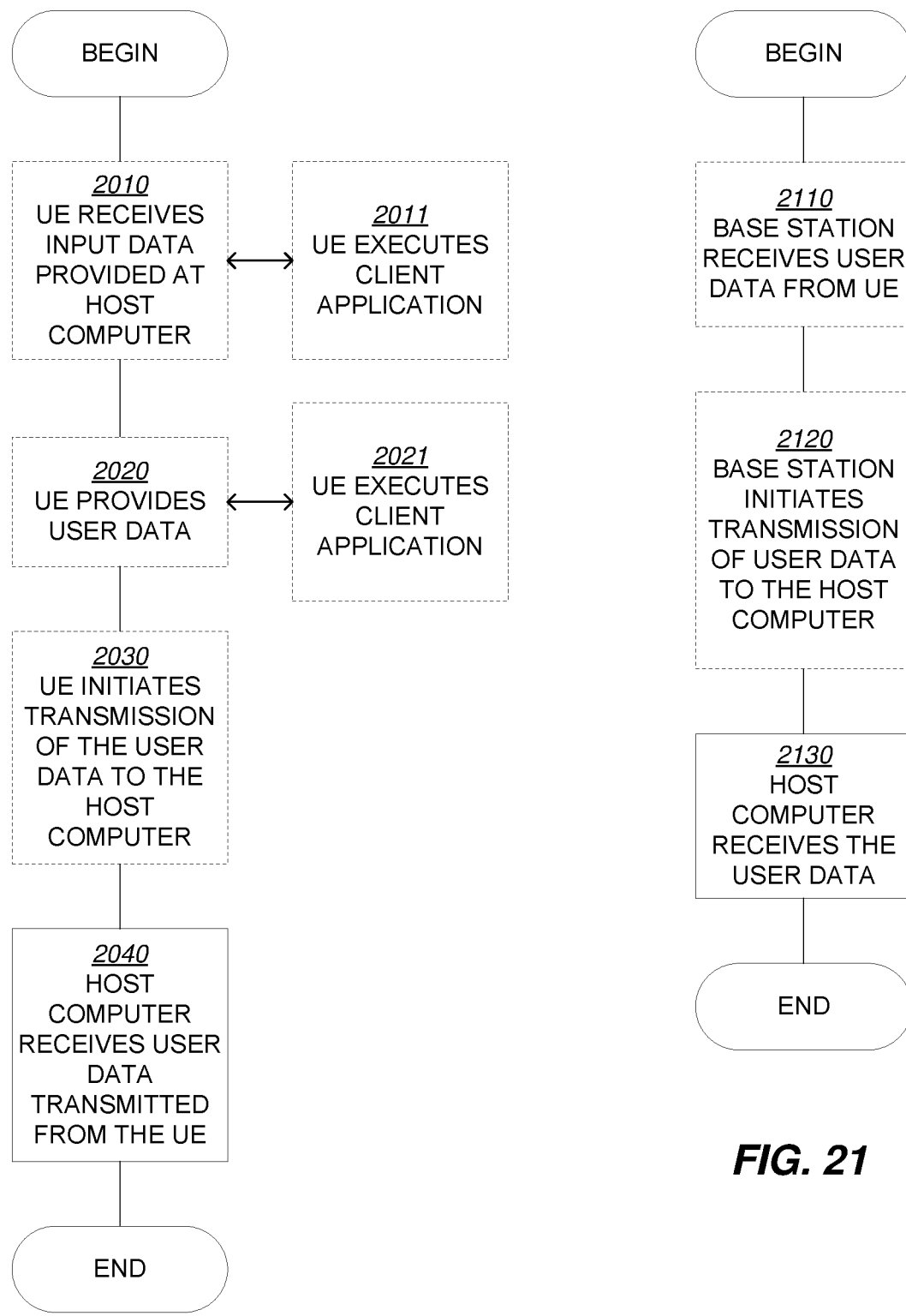

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In an optional first step 2010 of the method, the UE receives input data provided by the host computer. Additionally, or alternatively, in an optional second step 2020, the UE provides user data. In an optional substep 2021 of the second step 2020, the UE provides the user data by executing a client application. In a further optional substep 2011 of the first step 2010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2030, transmission of the user data to the host computer. In a fourth step 2040 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In an optional first step 2110 of the method, in accordance with the teachings of the embodiments described throughout this disclosure, the base station receives user data from the UE. In an optional second step 2120, the base station initiates transmission of the received user data to the host computer. In a third step 2130, the host computer receives the user data carried in the transmission initiated by the base station.

According to some embodiments, a communication system includes a host computer comprising processing circuitry configured to provide user data and a communication interface configured to forward the user data to a cellular network for transmission to a UE, where the cellular network comprises a base station configured to perform any of the techniques described herein for the network node. The communication system may further include the base station and may further include the UE, where the UE is configured to communicate with the base station. The processing circuitry of the host computer may be configured to execute a host application, thereby providing the user data, and the UE may include processing circuitry configured to execute a client application associated with the host application.

According to some embodiments, a method implemented in a communication system includes a host computer, a base station and a UE. The method includes at the host computer, providing user data, and at the host computer, initiating a transmission carrying the user data to the UE via a cellular network comprising the base station, where the method at the base station may include any of the techniques described herein for the network node. The method may include, at the base station, transmitting the user data. The user data may be provided at the host computer by executing a host application, the method further comprising, at the UE, executing a client application associated with the host application.

According to some embodiments, a communication system includes a host computer comprising processing circuitry configured to provide user data and a communication interface configured to forward user data to a cellular network, where the UE comprises a radio interface and processing circuitry, the UE's processing circuitry configured to perform any of the techniques described herein for the wireless device. The communication system may further include the UE, and the cellular network may further include a base station configured to communicate with the UE. The processing circuitry of the host computer may be configured to execute a host application, thereby providing the user data, and the UE's processing circuitry may be configured to execute a client application associated with the host application.

According to some embodiments, a method implemented in a communication system includes a host computer, a base station and a UE, the method comprising, at the host computer, providing user data and at the host computer, initiating a transmission carrying the user data to the UE via a cellular network comprising the base station, where the method at the UE comprises any of the techniques described herein for the wireless device. The method at the UE may include receiving the user data from the base station.

According to some embodiments, a communication system includes a host computer comprising a communication interface configured to receive user data originating from a transmission from a UE to a base station, the UE's processing circuitry configured to perform any of the techniques described herein for the wireless device. The communication system may further include the UE and may further include the base station, where the base station may comprise a radio interface configured to communicate with the UE and a communication interface configured to forward to the host computer the user data carried by a transmission from the UE to the base station. The processing circuitry of the host computer may be configured to execute a host application, and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data. The method in a UE may comprise providing user data and forwarding the user data to a host computer via the transmission to the base station.

According to some embodiments, a method implemented in a communication system includes a host computer, a base station and a UE, the method comprising at the host computer, receiving user data transmitted to the base station from the UE, where the method at the UE may comprises any of the techniques described herein for the wireless device. The method at the UE may include providing the user data to the base station. The method at the UE may include executing a client application, thereby providing the user data to be transmitted and at the host computer, executing a host application associated with the client application. The method at the UE may include at the UE, executing a client application and at the UE, receiving input data to the client application, the input data being provided at the host computer by executing a host application associated with the client application, where the user data to be transmitted may be provided by the client application in response to the input data.

According to some embodiments, a communication system includes a host computer comprising a communication interface configured to receive user data originating from a transmission from a UE to a base station, where the base station comprises a radio interface and processing circuitry, the base station's processing circuitry configured to perform any of the techniques described herein for the network node. The communication system may include the base station and/or the UE, where the UE is configured to communicate with the base station. The processing circuitry of the host computer may be configured to execute a host application, and the UE may be configured to execute a client application associated with the host application, thereby providing the user data to be received by the host computer.

According to some embodiments, a method implemented in a communication system includes a host computer, a base station and a UE, the method comprising at the host computer, receiving, from the base station, user data originating from a transmission which the base station has received from the UE, where the method at the base station comprises any of the techniques described herein for the network node. The method at the base station may include receiving the user data from the UE. The method at the base station may include initiating a transmission of the received user data to the host computer.

As discussed in detail above, the techniques described herein, e.g., as illustrated in the process flow diagrams of FIGS. 12, 13 and 15, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 22:
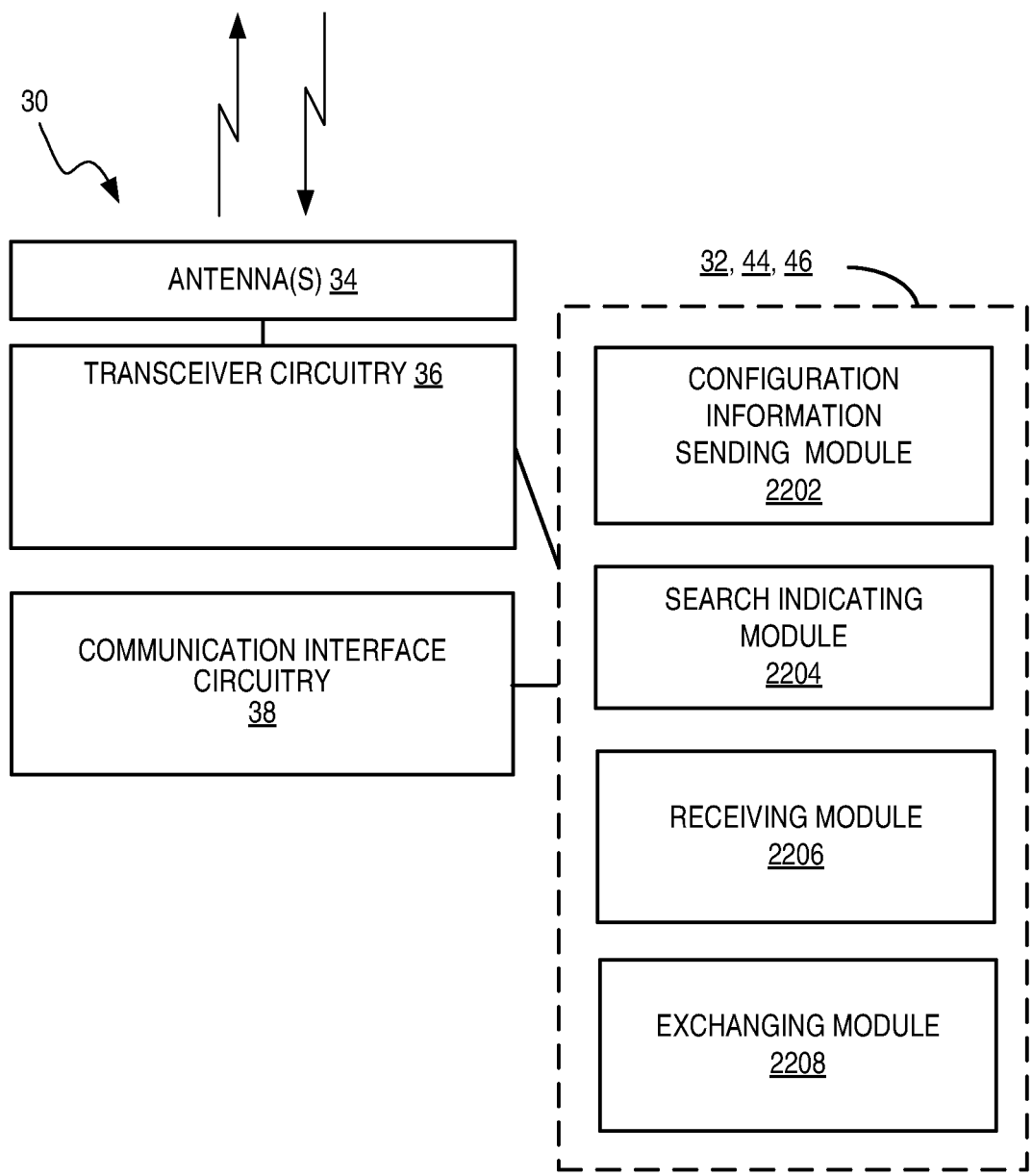
FIG. 22 is a block diagram illustrating a functional implementation of a network node, according to some embodiments.

FIG. 22 illustrates an example functional module or circuit architecture in one or more network nodes, such as network node 30, operating in a wireless network that serves a plurality of UEs. The functional implementation includes a configuration information sending module 2202 for sending, to a wireless device, configuration information indicating that the wireless device is to report identifier information for a cell, the configuration information identifying a first frequency at which at least a first part of system information for the cell may be obtained. The implementation also includes a search indicating module 2204 for indicating, to the wireless device, that the wireless device is permitted to perform a search for a second part of system information on a second frequency, in the event that the second part of system information for the cell is not transmitted on the first frequency, the second part of system information for the cell being necessary for determining the identifier information. The implementation includes a receiving module 2206 for receiving, from the wireless device, the identifier information for the cell.

FIG. 22 also illustrates an exchanging module 2208 for exchanging, with a second network node operating in the wireless communications network, information indicating frequencies for CD-SSBs associated with neighbor cells. This module would be used in another example functional module or circuit architecture in a network node.

Figure 23:
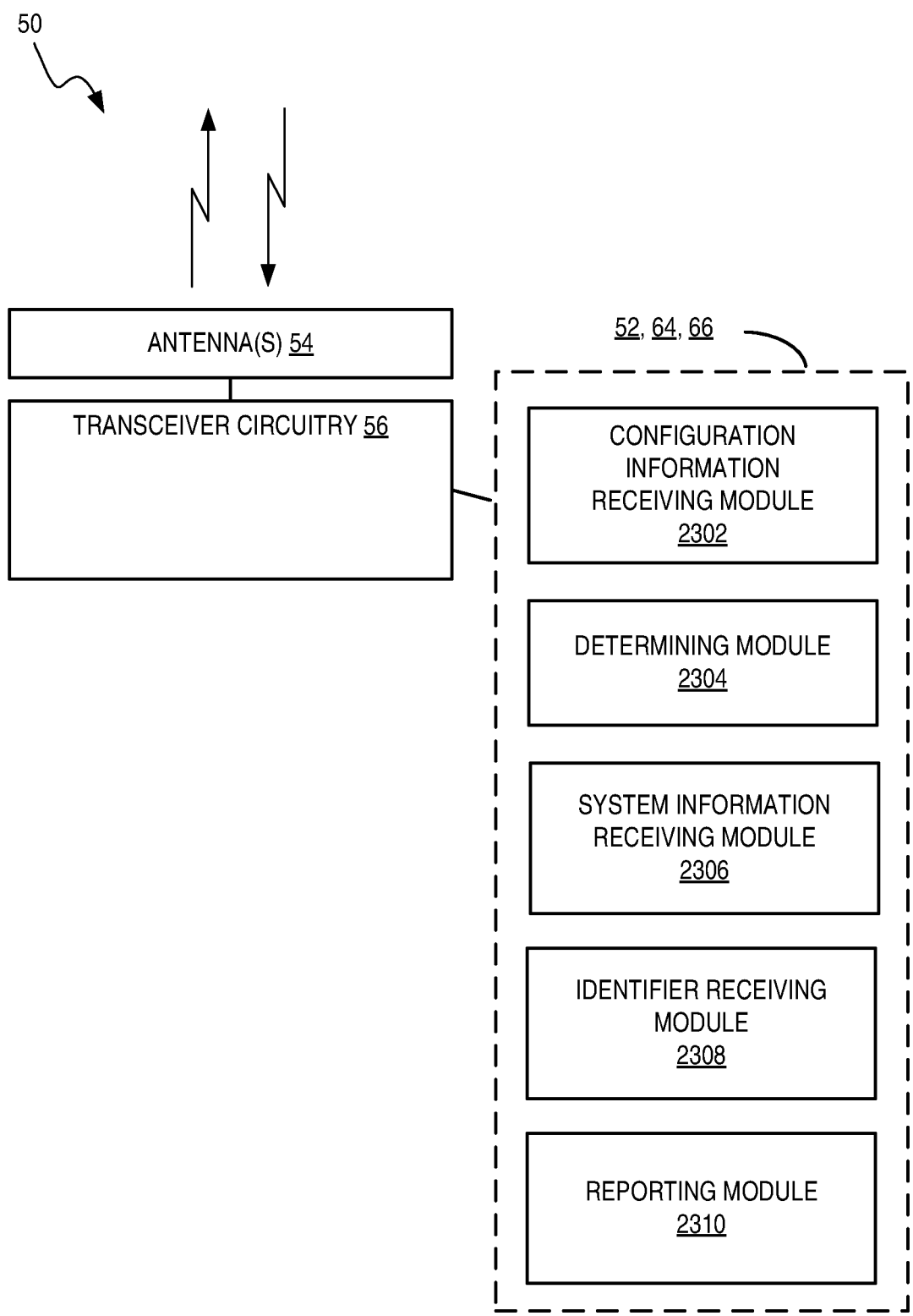
FIG. 23 is a block diagram illustrating a functional implementation of a wireless device, according to some embodiments.

FIG. 23 illustrates an example functional module or circuit architecture for a wireless device 50 operating in a wireless network. The functional implementation includes a configuration information receiving module 2302 for receiving configuration information indicating that the wireless device is to report identifier information for a cell, the configuration information identifying a first frequency. The implementation also includes a system information receiving module 2306 for receiving a first part of system information for the cell on the first frequency, using the configuration information. The implementation also includes a determining module 2304 for determining that a second part of system information for the cell is not transmitted on the first frequency, the second part of system information for the cell being necessary for determining the identifier information. The implementation includes an identifier receiving module 2308 for receiving the second part of system information, including the identifier information, on a second frequency and a reporting module 2310 for reporting the identifier information for the cell to the wireless communications network.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method performed by a wireless device operating in a wireless communications network, the method comprising:
   receiving configuration information indicating that the wireless device is to report identifier information for a cell, the configuration information identifying a first frequency;
   acquiring a first part of system information for the cell on the first frequency, using the configuration information;
   determining that a second part of system information for the cell is not transmitted on the first frequency, the second part of system information for the cell being necessary for determining the identifier information;
   sending a first report indicating that the second part of system information for the cell containing identifier information for the cell is not transmitted on the first frequency;
   after sending the first report, receiving additional configuration information indicating a second frequency;
   receiving the second part of system information, including the identifier information, on the second frequency using a different physical cell identifier, PCI, from that used for said receiving the first part of system information for the cell, wherein the different PCI is indicated by the additional configuration information; and
   reporting the identifier information for the cell to the wireless communications network.

2. The method of claim 1, wherein determining that the second part of system information for the cell is not transmitted on the first frequency comprises determining that a System Information Block type 1, (SIB1) for the cell is not transmitted on the first frequency.

3. The method of claim 1, wherein the identifier information comprises a cell global identifier, CGI, for the cell.

4. The method of claim 3, wherein the identifier information further comprises a tracking area code, TAC, or a public land mobile network, PLMN, identity list, or both.

5. The method of claim 1, wherein said receiving the second part of system information comprises receiving a cell-defining synchronization block, CD-SSB, that includes the identifier information.

6. The method of claim 5, wherein determining that the second part of system information for the cell is not transmitted on the first frequency comprises determining that the cell has an associated CD-SSB transmitted on the second frequency, the second frequency being indicated in the first part of the system information.

7. The method of claim 5, wherein the CD-SSB comprises a System Information Block type 1, SIB1, and wherein the method comprises obtaining the identifier information using the SIB 1.

8. The method of claim 1, wherein said receiving the second part of system information for the cell is performed using a physical cell identifier, PCI, identical to that used for said receiving the first part of system information for the cell.

9. The method of claim 1, wherein said receiving the second part of system information for the cell is performed using a different physical cell identifier, PCI, from that used for said receiving the first part of system information for the cell, wherein the different PCI is derived by the wireless device according to a predetermined rule.

10. The method of claim 1, wherein the method further comprises determining the second frequency from the first part of system information for the cell.

11. The method of claim 10, wherein the method further comprises determining, from the first part of system information for the cell, a physical cell identifier, PCI, for said receiving the second part of system information for the cell.

12. The method of claim 10, wherein the method further comprises deriving a physical cell identifier, PCI, for said receiving the second part of system information for the cell from a different PCI used for said receiving the first part of system information for the cell.

13. The method of claim 1, wherein the method comprises:
responsive to said determining that the second part of system information for the cell is not transmitted on the first frequency, re-starting a timer that limits time spent searching for the identifier information for the cell.

14. A method in a network node operating in a wireless communications network, the method comprising:
sending, to a wireless device, configuration information indicating that the wireless device is to report identifier information for a cell, the configuration information identifying a first frequency at which at least a first part of system information for the cell is obtained;
indicating, to the wireless device, that the wireless device is permitted to perform a search for a second part of system information on a second frequency, in the event that the second part of system information for the cell is not transmitted on the first frequency, the second part of system information for the cell being necessary for determining the identifier information;
sending additional configuration information indicating the second frequency to the wireless device, wherein the additional configuration information comprises a different physical cell identifier, PCI, from that used for said receiving the first part of system information for the cell, to obtain the second part of system information; and
receiving, from the wireless device, the identifier information for the cell.

15. The method of claim 14, wherein the identifier information comprises a cell global identifier, CGI, for the cell.

16. A wireless device configured to operate in a wireless communications network, comprising:
transceiver circuitry configured for communicating with the wireless communications network; and
processing circuitry operatively associated with the transceiver circuitry and configured to:
acquire configuration information indicating that the wireless device is to report identifier information for a cell, the configuration information identifying a first frequency;
receive a first part of system information for the cell on the first frequency, using the configuration information;
determine that a second part of system information for the cell is not transmitted on the first frequency, the second part of system information for the cell being necessary for determining the identifier information;
send a first report indicating that the second part of system information for the cell containing identifier information for the cell is not transmitted on the first frequency;
after sending the first report, receive additional configuration information indicating a second frequency;
receive the second part of system information, including the identifier information, on the second frequency using a different physical cell identifier, PCI, from that used for said receiving the first part of system information for the cell, wherein the different PCI is indicated by the additional configuration information; and
report the identifier information for the cell to the wireless communications network.

17. A network node configured to operate in a wireless communications network, comprising:
transceiver circuitry configured for communicating with wireless devices; and processing circuitry operatively associated with the transceiver circuitry and configured to:
send, to a wireless device, configuration information indicating that the wireless device is to report identifier information for a cell, the configuration information identifying a first frequency at which at least a first part of system information for the cell is obtained;
indicate, to the wireless device, that the wireless device is permitted to perform a search for a second part of system information on a second frequency, in the event that the second part of system information for the cell is not transmitted on the first frequency, the second part of system information for the cell being necessary for determining the identifier information;
send an additional configuration information indicating the second frequency to the wireless device, wherein the additional configuration information comprises a different physical cell identifier, PCI, from that used for said receiving the first part of system information for the cell, to obtain the second part of system information; and
receive, from the wireless device, the identifier information for the cell.

* * * * *